United States Patent
Kelly et al.

(10) Patent No.: US 12,296,637 B2
(45) Date of Patent: May 13, 2025

(54) VEHICLE ACTIVE SUSPENSION CONTROL SYSTEM AND METHOD

(71) Applicant: JAGUAR LAND ROVER LIMITED, Coventry (GB)

(72) Inventors: Jim Kelly, Solihull (GB); Luke Birch, Mickleton (GB); Dennis Lausecker, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 189 days.

(21) Appl. No.: 18/017,448

(22) PCT Filed: Jul. 21, 2021

(86) PCT No.: PCT/EP2021/070406
§ 371 (c)(1),
(2) Date: Jan. 23, 2023

(87) PCT Pub. No.: WO2022/018144
PCT Pub. Date: Jan. 27, 2022

(65) Prior Publication Data
US 2023/0271470 A1    Aug. 31, 2023

(30) Foreign Application Priority Data
Jul. 21, 2020   (GB) .................................... 2011282

(51) Int. Cl.
*B60G 17/017*    (2006.01)
(52) U.S. Cl.
CPC ........ *B60G 17/017* (2013.01); *B60G 2500/30* (2013.01)

(58) Field of Classification Search
CPC .......................... B60G 17/017; B60G 2500/30
See application file for complete search history.

(56) References Cited

U.S. PATENT DOCUMENTS

| | | |
|---|---|---|
| 8,413,997 B1 | 4/2013 | Coombs |
| 2004/0236486 A1 | 11/2004 | Krause |

(Continued)

FOREIGN PATENT DOCUMENTS

| | | |
|---|---|---|
| DE | 102008006849 A1 | 8/2009 |
| DE | 102018214599 A1 | 3/2020 |

(Continued)

OTHER PUBLICATIONS

English translation of Japanese Office Action corresponding to application 2023-504458, dated Jan. 30, 2024, 3 pages.
(Continued)

*Primary Examiner* — Jacob M Amick
(74) *Attorney, Agent, or Firm* — TROUTMAN PEPPER LOCKE LLP; Dustin B. Weeks; Nicholas H. Doss

(57) ABSTRACT

Aspects of the present invention relate to a method and to a control system for controlling an active suspension of a vehicle comprising a vehicle body and a plurality of wheels, the control system comprising one or more controllers, the control system configured to: receive information indicative of a requirement for ingress/egress of passengers and/or cargo; receive information indicative that the ingress/egress is to occur with the vehicle on a sloped surface; and control the active suspension to reduce an angle of the vehicle body relative to horizontal, for the ingress/egress on the sloped surface.

20 Claims, 9 Drawing Sheets

(56) References Cited

U.S. PATENT DOCUMENTS

| | | | |
|---|---|---|---|
| 2007/0007734 A1 | | 1/2007 | Brookes et al. |
| 2008/0174079 A1 | * | 7/2008 | Brookes et al. |
| 2017/0246975 A1 | * | 8/2017 | Weldy .................. B60G 17/027 |
| 2018/0154727 A1 | * | 6/2018 | Lavoie ................. B60G 17/018 |

FOREIGN PATENT DOCUMENTS

| | | |
|---|---|---|
| EP | 1615787 A2 | 1/2006 |
| FR | 2978941 A1 | 2/2013 |
| GB | 2528065 A | 1/2016 |
| GB | 2559026 A | 7/2018 |
| JP | 2005193890 A | 7/2005 |
| JP | 2006143121 A | 6/2006 |
| JP | 2007501742 A | 2/2007 |
| JP | 2007314004 A | 12/2007 |
| JP | 2017171067 A | 9/2017 |
| JP | 2017211229 A | 11/2017 |
| WO | 2020117111 A1 | 6/2020 |

OTHER PUBLICATIONS

Combined Search and Examination Report for Application No. GB1908399.7, dated Dec. 4, 2019, 7 pages.
Combined Search and Examination Report for Application No. GB2011282.7, dated Dec. 24, 2020, 5 pages.
Great Britain Examination Report under Section 18(3) corresponding to Application No. GB2011282.7, dated Jan. 17, 2023, 4 pages.
International Search Report and Written Opinion for Application No. PCT/EP2021/070406, dated Nov. 8, 2021, 13 pages.
Japanese Notification of reasons for refusal corresponding to application 2023-504458, dated Jul. 11, 2024, 9 pages.

* cited by examiner

VEHICLE ACTIVE SUSPENSION CONTROL SYSTEM AND METHOD

TECHNICAL FIELD

The present disclosure relates to a vehicle active suspension control system and method. In particular, but not exclusively it relates to an active suspension control system and method in a road vehicle.

BACKGROUND

Active suspensions for vehicles are known. Active suspensions include hydraulically actuated suspensions, electronically actuated hydraulic suspensions, pneumatic suspensions, and electromagnetic suspensions. An active suspension may comprise an active damper (shock absorber) and/or may comprise an active spring. Active suspensions have the advantage that spring force and/or damper force can be varied in use using a control system. This enables an adaptive compromise between comfort and improved road handling. The increasing automation of vehicles, including shared mobility vehicles such as taxis, gives rise to new challenges and opportunities to improve passenger comfort.

SUMMARY OF THE INVENTION

It is an aim of the present invention to address one or more of the disadvantages associated with the prior art.

Aspects and embodiments of the invention provide a control system, a method, a vehicle, and computer software as claimed in the appended claims.

According to an aspect of the present invention, there is provided a control system for controlling an active suspension of a vehicle comprising a vehicle body and a plurality of wheels, the control system comprising one or more controllers, the control system configured to: receive information indicative of a requirement for ingress/egress of passengers and/or cargo; receive information indicative that the ingress/egress is to occur with the vehicle on a sloped surface; and control the active suspension to reduce an angle of the vehicle body relative to horizontal, for the ingress/egress on the sloped surface. An advantage is that the vehicle is easier to access because ingress/egress is easier on slopes.

In some examples, the sloped surface comprises a transverse slope and the active suspension is configured to tilt the vehicle body about a roll axis to reduce the angle of the vehicle body. In some examples, the sloped surface comprises a longitudinal slope and the active suspension is configured to pitch the vehicle body about a pitch axis to reduce the angle of the vehicle body.

The control system may be configured to: determine a magnitude of slope of the surface; and control the active suspension to reduce the angle of the vehicle body relative to horizontal for the ingress/egress on the sloped surface when the determination is that the magnitude is above a threshold, and not control the active suspension to reduce the angle of the vehicle body relative to horizontal for the ingress/egress on the sloped surface when the determination is that the magnitude is below the threshold.

The control system may be configured to: determine whether the surface slopes in a first direction or in a second opposite direction; and control the active suspension to reduce the angle of the vehicle body relative to horizontal for the ingress/egress on the sloped surface up to a first limit when the determination is that the surface slopes in the first direction and up to a second limit when the determination is that the surface slopes in the second direction. An advantage is improving occupant perception of surroundings. For example, the method may ensure that occupants can see the horizon on the downhill facing side of the vehicle.

The control system may be configured to: poll for information indicative of at least one ingress/egress characteristic; and control the active suspension to reduce the angle of the vehicle body relative to horizontal for the ingress/egress on the sloped surface when the polling does not obtain information indicative of at least one ingress/egress characteristic, and not control the active suspension to reduce the angle of the vehicle body relative to horizontal for the ingress/egress on the sloped surface when the polling obtains information indicative of at least one ingress/egress characteristic. An advantage is improved flexibility for different ingress/egress requirements. In some examples, the information indicative of at least one ingress/egress characteristic may comprise a wheel ingress/egress requirement associated with wheeling an object onto/off the vehicle. In some examples, the information indicative of at least one ingress/egress characteristic may comprise a loading/unloading of cargo requirement associated with loading cargo onto/off the vehicle.

The information indicative of a requirement for ingress/egress may be indicative of a requirement for the vehicle to autonomously stop in response to a user request for ingress/egress.

In some examples, a location of the sloped surface is associated with an autonomously selected ingress/egress location, wherein the selection is dependent on a user-dependent route of the vehicle and information from at least one localization sensor, and wherein the user-dependent route of the vehicle is dependent on a user-dependent journey constraint.

The control system may be configured to: determine a difference in height and/or a difference in angle, between the vehicle body and an ingress/egress surface; and control the active suspension to reduce the difference in height, and/or control the active suspension to reduce the difference in angle of the vehicle body relative to the ingress/egress surface about a second axis and reduce the angle of the vehicle body relative to horizontal about a first axis. An advantage is that the vehicle is easier to access because the vehicle kneels down (or up) for ingress/egress surfaces (e.g. kerbs).

The control system may be configured to: receive information indicative of a camber of the ingress/egress surface; and control whether or to what extent the active suspension is controlled to reduce the difference in angle of the vehicle body relative to horizontal, in dependence on the camber. An advantage is that the kneeling is performed when the step distance can be reduced.

According to another aspect of the present invention, there is provided a vehicle comprising the control system. In some examples, the vehicle is configured for autonomous driving. In some examples, the vehicle is a shared mobility vehicle.

According to another aspect of the present invention, there is provided a method of controlling an active suspension of a vehicle comprising a vehicle body and a plurality of wheels, the method comprising: receiving information indicative of a requirement for ingress/egress of passengers and/or cargo; receiving information indicative that the ingress/egress is to occur with the vehicle on a sloped surface; and controlling the active suspension to reduce an angle of the vehicle body relative to horizontal, for the ingress/egress on the sloped surface.

According to another aspect of the present invention, there is provided computer software that, when executed, is arranged to perform any one or more of the methods described herein. According to another aspect of the present invention, there is provided a non-transitory computer-readable storage medium comprising the computer software.

According to another aspect of the present invention, there is provided a control system configured to perform any one or more of the methods described herein.

The one or more controllers may collectively comprise: at least one electronic processor having an electrical input for receiving the information; and at least one electronic memory device electrically coupled to the at least one electronic processor and having instructions stored therein; and wherein the at least one electronic processor is configured to access the at least one memory device and execute the instructions thereon so as to cause the control system to control the active suspension in dependence on the information.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
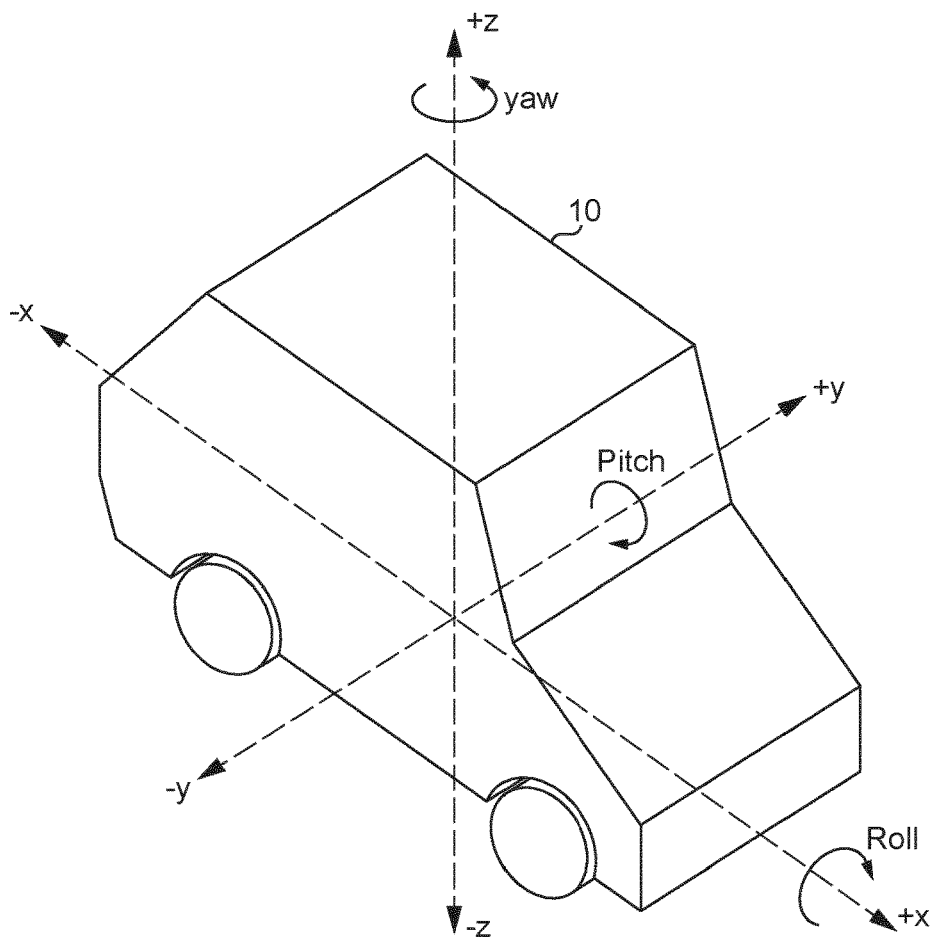
FIG. 1 illustrates an example of a vehicle.

FIG. 1 illustrates an example of a road vehicle 10 ('vehicle' herein) in which embodiments of the invention can be implemented. In some, but not necessarily all examples, the vehicle 10 is a passenger vehicle, also referred to as a passenger car or as an automobile. In other examples, the vehicle 10 may be a cargo vehicle such as a van. Passenger cars and vans generally have kerb weights of less than 4000 kg. Passenger cars and vans generally have lengths of less than 7 metres. In other examples, embodiments of the invention can be implemented for other applications, such as industrial or commercial vehicles.

FIG. 1 also illustrates an on-vehicle 3D coordinate system defining three perpendicular axes and Euler angles. The coordinate system comprises a longitudinal x-axis. The vehicle 10 is configured to drive in the positive x-direction (positive acceleration) and reverse in the negative x-direction (negative acceleration=deceleration). The x-axis also defines an axis of roll. It will be appreciated that the vehicle comprises a body comprising a cabin suspended via a suspension system disposed between the body and the wheels. The action of the suspension system provided for relative vertical movement between the wheels and the vehicle body which in turn allow for a degree of controlled body roll and body pitch relative to the wheels.

The coordinate system comprises a lateral, transverse y-axis. The vehicle 10 is configured to steer while in motion, to impose lateral acceleration in the y-axis. The vehicle 10 is configured to steer left in the positive y-direction and to steer right in the negative y-direction. The y-axis also defines an axis of pitch. The vehicle 10 may be configured for front-wheel steering, rear-wheel steering, or four-wheel steering. The vehicle 10 may be configured to traverse using rack-and-pinion steering/Ackermann steering, etc. In some examples, the vehicle 10 may be configured to traverse by steering yaw (e.g. sideslip, crabbing) of the vehicle 10.

The coordinate system comprises a vertical z-axis. A ride height of the vehicle 10 increases in the positive z-direction and decreases in the negative z-direction. Vehicle heave is movement in the z-axis. The z-axis also defines an axis of yaw.

Figure 2A:
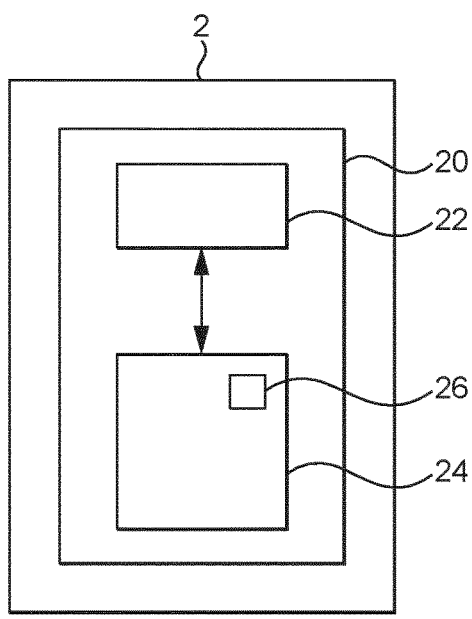
FIG. 2A illustrates an example of a control system and FIG. 2B illustrates an example of a non-transitory computer-readable medium.

FIG. 2A illustrates a control system 2. The control system 2 comprises one or more controllers. One controller 20 is shown, as an example.

The controller 20 of FIG. 2A includes at least one electronic processor 22; and at least one electronic memory device 24 electrically coupled to the electronic processor 22 and having instructions 26 (e.g. a computer program) stored therein, the at least one electronic memory device 24 and the instructions 26 configured to, with the at least one electronic processor 22, cause any one or more of the methods described herein to be performed. An example controller 20 of the control system 2 is an active suspension controller, for controlling an actuator of the active suspension.

Figure 2B:
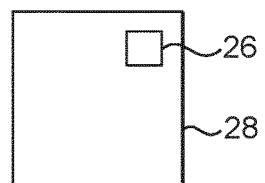

FIG. 2B illustrates a non-transitory computer-readable storage medium 28 comprising the instructions 26 (computer software).

Figure 3:
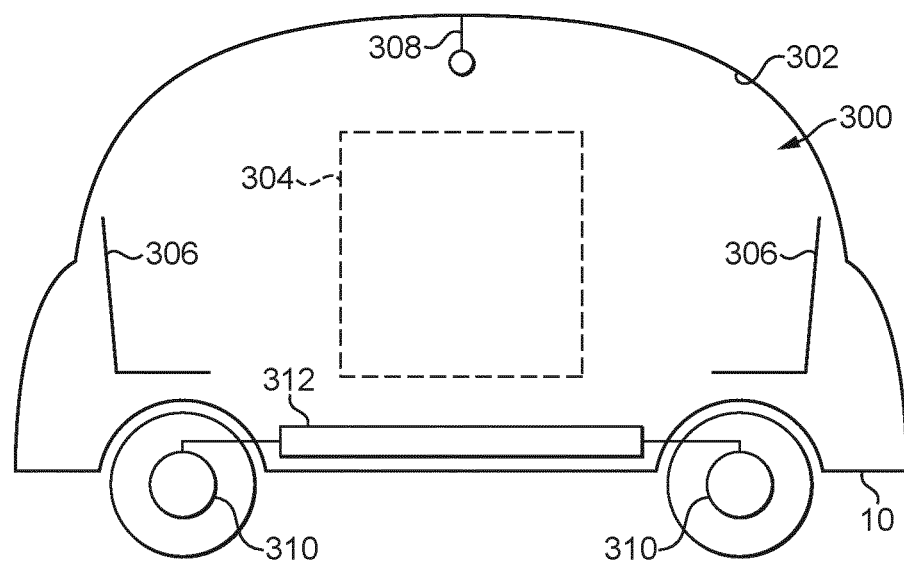
FIG. 3 illustrates an example of a cabin of a vehicle.

FIG. 3 illustrates an example of a vehicle 10, showing the cabin 300 and a powertrain. The illustrated cabin 300 comprises the interior of the vehicle 10 at least partially enclosed by a body 302 of the vehicle 10. The cabin 300 is accessible from at least one door 304. The door 304 may be a sliding door or a swinging door.

The cabin 300 comprises passenger seats 306 for sitting passengers. The cabin 300 may comprise handles 308 for standing passengers. The handles 308 may be grab handles. The grab handles 308 for standing passengers may be located in areas not reachable from seats 306. Standing passengers are more easily unbalanced by unexpected vehicle motions than sitting passengers.

In the illustration, at least one passenger seat 306 is facing a different direction from at least one other passenger seat 306. The illustrated seats 306 are facing in opposite directions. This seating arrangement enables more interior legroom and luggage room, and more personal space for passengers unfamiliar with each other. However, passengers not directly facing a direction of travel of the vehicle 10 are more likely to experience motion sickness and/or are less able to anticipate vehicle motions.

FIG. 3 shows a layout in which at least one seat 306 or row of seats 306 is located above an axle of the vehicle 10. An axle corresponds to a pair of laterally separated wheels in this example. Passengers located above or overhanging the axles experience greater heave (z-axis translation) from vehicle suspension movements, than passengers located within a wheelbase of the vehicle 10.

The illustrated cabin arrangement is one example of many possible cabin arrangements.

In an alternative example, the vehicle 10 is a cargo vehicle. The cabin 300 may comprise fewer seats, or no passenger seats if the vehicle 10 is an autonomous vehicle. Some cargo may be fragile and sensitive to excessive cabin accelerations.

In some examples, the vehicle 10 of FIG. 3 may be a shared mobility vehicle. A shared mobility vehicle may comprise a billing module (not shown) for determining a bill for a journey, in dependence on automatic monitoring of time and/or distance. If the vehicle is driverless, customer payments may be processed via an onboard payment terminal and/or via automatic (e.g. geofence-triggered) communication with an external server managing a user account and payments (e.g. ride-hailing app). The billing module may issue tickets or receipts via an onboard printer and/or may issue tickets or receipts via the automatic communication.

In some, but not necessarily all examples, the shared mobility vehicle may be implemented as a pod. A pod is defined herein as a shared mobility vehicle configured for limited occupancy compared to a bus or train, and comprising three or more vehicle wheels. For example, a pod may have space for between one and six occupants depending on implementation. The pod may comprise between one and six seats. The pod may be configured for driving in pedestrianised areas up to a predetermined maximum speed. The pod may be configured for on-road driving at or greater than the predetermined maximum speed.

According to FIG. 3, but not necessarily in all examples, the vehicle 10 comprises a traction battery 312 and electric traction motor(s) 310. The vehicle 10 may therefore be a fully electric vehicle (EV) or a hybrid electric vehicle (HEV). In other examples, the vehicle 10 may comprise an internal combustion engine or other torque source. The vehicle 10 may even be gravity driven and may lack a torque source. In some, but not necessarily all examples, the vehicle 10 may be a non-road vehicle, such as a rail vehicle, a magnetic levitation vehicle, etc.

Figure 4:
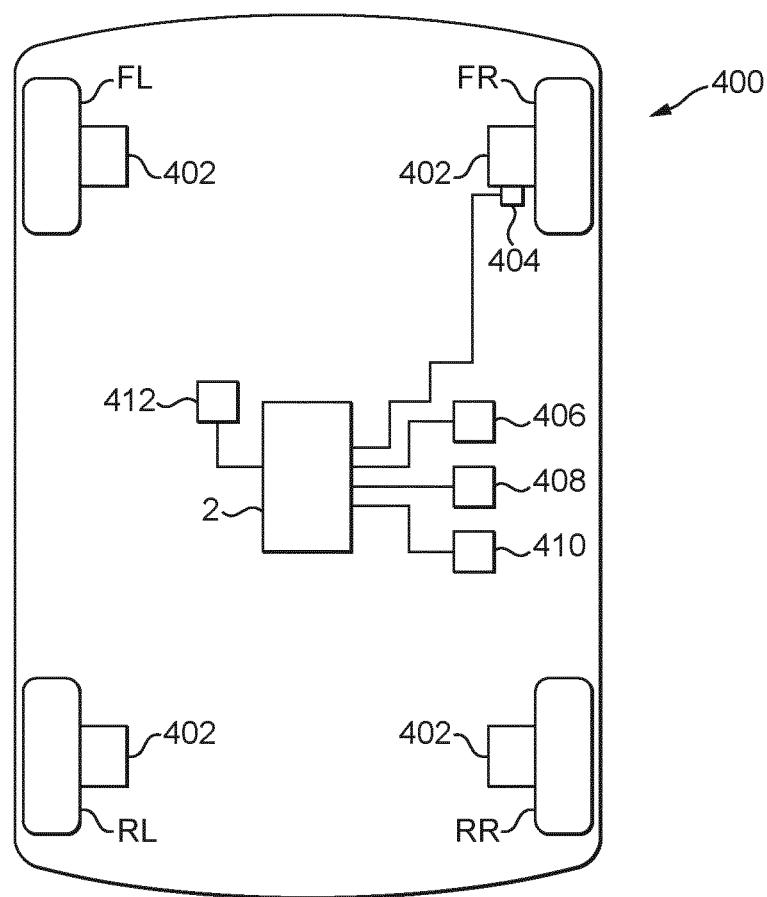
FIG. 4 illustrates an example of a system for a vehicle.

FIG. 4 illustrates a system 400 comprising control system 2, sensors, interfaces and actuators of a vehicle 10. The vehicle 10 may be the vehicle 10 of FIGS. 1 and 3.

The vehicle 10 comprises an active suspension 402, an example of which is shown in FIG. 4. The active suspension 402 may be configured for active damping. The active damping may be controlled using a pump-controlled hydraulic circuit or equivalent. Bump force and/or rebound force may be individually controllable.

The active suspension 402 may be configured for active spring control. The active spring control may be controlled using a pump-controlled pneumatic system, or equivalent. Spring force (spring rate) may be controllable. Ride height may be controllable. The active suspension 402 may enable active roll control and/or active pitch control, at one or more axles.

The active suspension 402 may be controlled by the control system 2, optionally via a further low-level controller. In some, but not necessarily all examples, the active suspension 402 may be controlled using a variable force parameter. The variable force parameter controls the extent to which the active suspension 402 prevents cabin/body movement of the vehicle 10. The variable force parameter may be a force demand (gain). The force demand may comprise a spring force demand for controlling spring stiffness, and/or the force demand may comprise a damping force demand for controlling bump force and/or rebound force. Control of a suspension fluid pump and/or flow restrictor (damping) may be dependent on the force demand. Increasing the force demand increases the spring force and/or the damping force, resulting in a 'stiffer' suspension. One force demand may control an active suspension setting for a plurality of vehicle wheels, or for one vehicle wheel.

The force demand may be a function of detected cabin motion. Detecting cabin motion may comprise monitoring inertial signals indicative of cabin motion, such as roll and/or pitch and/or heave.

The above force demand may be a negotiated force demand dependent on a plurality of individual force demands requested by a plurality of controllers. The plurality of controllers may comprise predictive controllers and reactive controllers. The controllers may comprise a skyhook controller and/or a groundhook controller. The negotiated force demand may be calculated by blending the individual force demands, for instance based on addition, priority and/or averaging. A skyhook controller approximates the situation in which the vehicle body maintains a stable posture relative to the sky, and as such is unaffected by ground conditions. It will be appreciated that the situation in which the vehicle body is completely unaffected by ground conditions is impractical, and as such a skyhook controller will approximate this condition, whilst taking into account energy and other real-world requirements. A groundhook controller achieves the same goal by controlling the vehicle wheels relative to the ground, leaving the vehicle body unaffected by ground conditions.

The active suspension 402 of the system 400 of FIG. 4 comprises one or more active components per vehicle wheel FL, FR, RL, RR such as an active damper and/or an active spring. The active suspension 402 may be a semi-active suspension with an active damper and passive spring or an active spring and passive damper. Sub-systems of the active suspension 402 are not shown, and can provided in any suitable arrangement for achieving the required control of the active suspension 402, required by one or more of the methods described herein.

The vehicle 10 may be an autonomous vehicle. The vehicle 10 may be a fully autonomous vehicle. A fully autonomous vehicle 10 is a driverless vehicle configured for autonomous-only driving. A fully autonomous vehicle 10 may lack an accelerator pedal, a brake pedal and/or a steering wheel. Therefore, a fully autonomous vehicle may lack a recognisable drivers seat. The vehicle may be configured for Level 5 automated driving, as defined in the Society of Automotive Engineers (SAE) Standard J3016.

Alternatively, the vehicle 10 may comprise a lower level autonomous driving mode for at least one driving task (steering/acceleration/braking) and a non-autonomous driving mode.

The control system 2 is configured to receive sensor-dependent information directly or indirectly from sensors, enabling the control system 2 to control the active suspension 402 based on a current vehicle context. FIG. 4 illustrates example sensors which are referred to by the methods described herein, including:

- An inertial measurement unit (IMU 408). The IMU 408 provides an indication of cabin motion. For example, the IMU 408 may indicate roll, pitch and/or heave.
- At least one cabin sensor 410. Cabin sensors 410 may provide an indication of vehicle occupancy and/or occupant behaviour. Cabin sensors 410 may comprise at least one of: cabin cameras for imaging vehicle occupants in the cabin 300; seatbelt sensors for detecting whether a seatbelt is fastened; seat weight sensors for detecting whether a seat is occupied, etc.
- At least one localization sensor 406. Localization sensors 406 provide information enabling an autonomous vehicle controller (not shown) to localize the vehicle 10 within a driving environment. The autonomous vehicle controller therefore plans vehicle manoeuvres of the vehicle 10 (acceleration and/or braking and/or steering) based on localization sensor information. Manoeuvre planning may comprise applying cost/reward functions associated with obstacle avoidance and journey requirements, etc, based on the localization sensor information. The at least one localization sensor 406 may comprise on-board external-facing vision systems (e.g. camera, lidar, radar) for imaging an environment around the vehicle 10 up to a specified range (e.g. 50-500 m) and with a certain field of view (e.g. 360 degrees). Additionally or alternatively, the at least one localization sensor 406 may comprise an interface for vehicle-to-vehicle (V2V) or vehicle-to-infrastructure (V2I) communication.
- At least one wheel sensor. Wheel sensors provide an indication of suspension state with respect to specific vehicle wheels. Wheel sensors include: wheel-to-body displacement sensors 404 for sensing suspension compression/extension (indicative of force); wheel position sensors; wheel hub accelerometers; etc.
- At least one user interface 412. The illustrated user interface 412 is an onboard user interface, i.e. an occupant interface. The cabin 300 may comprise a human-machine interface to provide the occupant interface. The occupant interface may comprise an ingress/egress request button for requesting an autonomous vehicle 10 to stop and drop-off the user. The occupant interface may comprise a door open/close button. The occupant interface may comprise a touch screen display/voice interface for receiving user-dependent information such as preferences and/or journey requirements. In some examples, the at least one user interface 412 may be configured to interface with a user device such as a smartphone, wherein the user device comprises a human-machine interface for at least one of the above functions.

The term 'user' as described herein refers to a current, potential or prior occupant (passenger) of the vehicle 10.

In an example use case, the above system 400 enables a user to input journey requirements such as a destination (egress location) and optionally a pickup location (ingress location). A control system may be configured to generate a user-dependent route that satisfies the journey requirements. The route and any ingress/egress locations are therefore configurable to define an ad-hoc shared mobility vehicle 10 (e.g. autonomous taxi).

Various methods of using the active suspension 402 are described below. The methods may be implemented separately, or in combination to achieve a greater effect.

Motion Feedback

Figure 5:
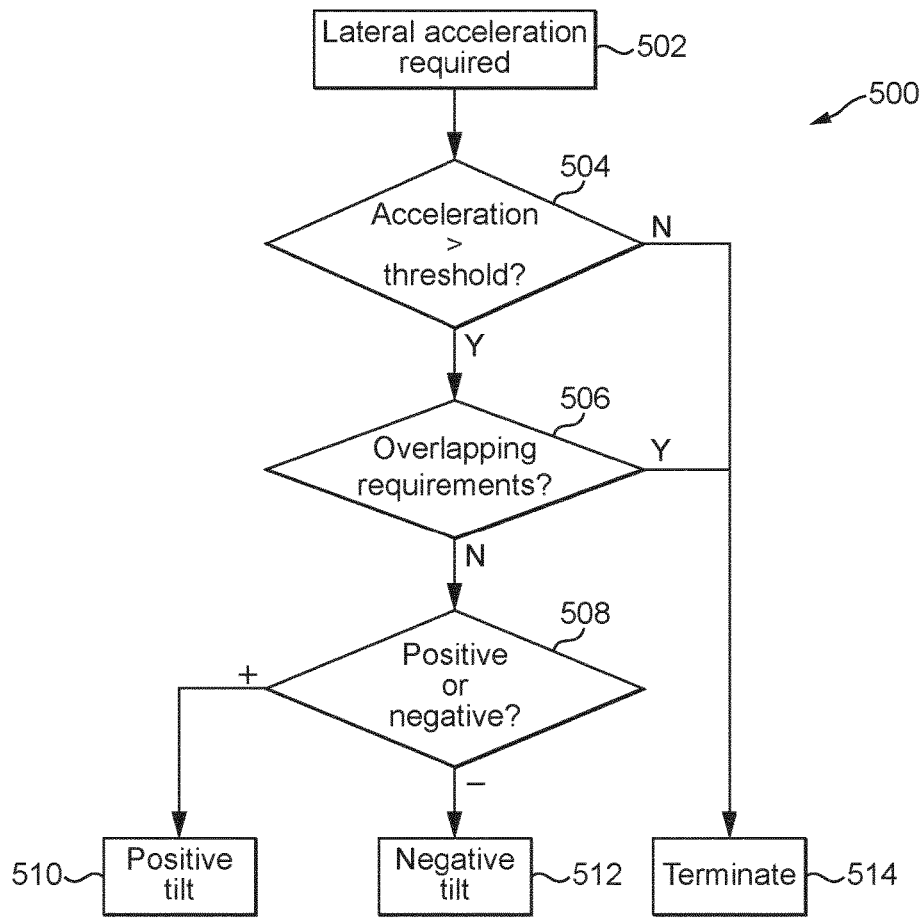
FIG. 5 illustrates an example of a control method.
Figure 7:
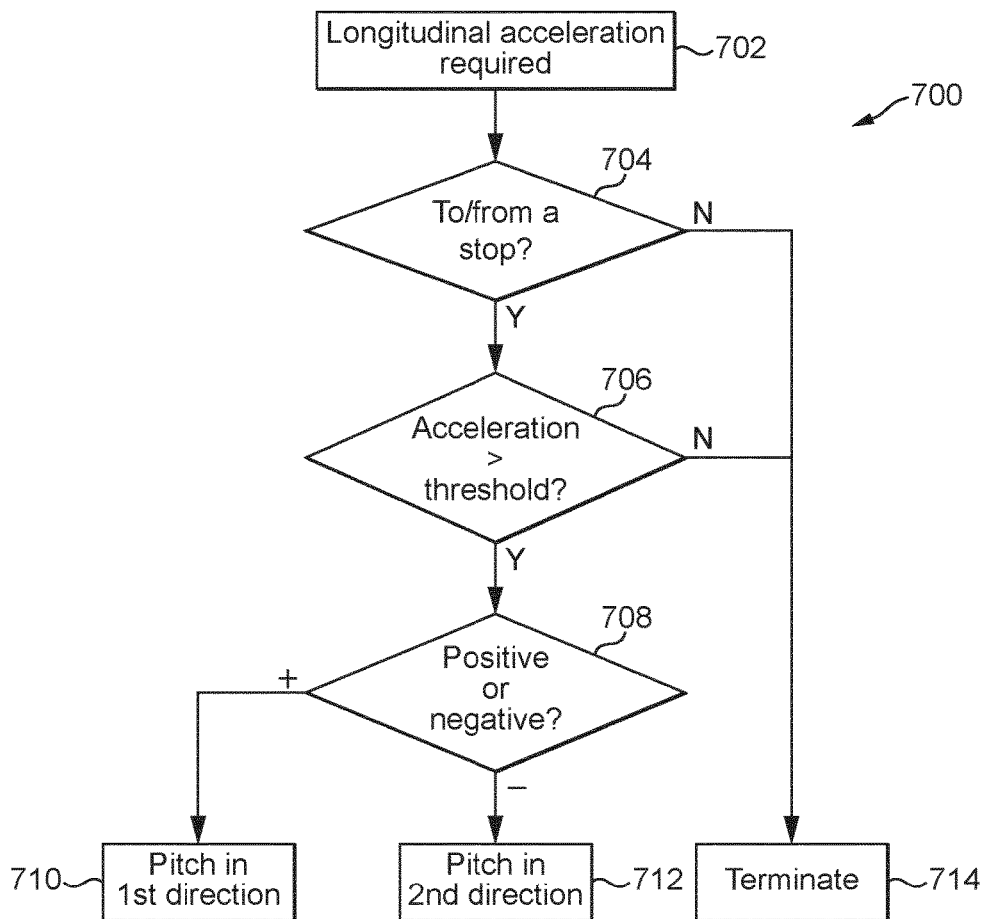
FIG. 7 illustrates an example of a control method.

FIGS. 5 and 7 illustrate control methods 500, 700 that improve comfort, and signal to occupants that an acceleration is about to commence. The methods impart small perceptible motions ('motion feedback' herein) to occupants, signalling that a larger acceleration is about to commence. Investigation has revealed that humans are better able to anticipate head motion if perceptible motion feedback is provided, rather than audible/visual/haptic feedback. This is because motion feedback triggers the vestibular system to start using closed-loop muscle control before the larger acceleration commences. Audible/visual/haptic stimuli only result in feedforward muscle control which is not as effective, and unwanted head jerk may occur before vestibular control transitions to closed loop.

The control method 500 of FIG. 5 relates to lateral acceleration and the control method 700 of FIG. 7 relates to longitudinal acceleration. Both control methods can be generalised as a method 500, 700 that improves comfort, the method comprising:

receiving information indicative of a requirement for positive or negative vehicle acceleration in a first axis; and controlling the active suspension 402 to commence modifying an angle of the vehicle body about a second axis perpendicular to the first axis in dependence on the receiving an indication, before commencement of the vehicle acceleration. The early timing provides motion feedback.

A further benefit of the methods 500, 700 is that a reference frame of the cabin 300 is rotated relative to the direction of vehicle acceleration, therefore reducing non-vertical acceleration components and increasing the vertical (head-to-toe) component. This reduces head jerk.

Motion Feedback for Lateral Acceleration

The lateral acceleration control method 500 of FIG. 5 commences at block 502, with receiving information indicative of a requirement for vehicle acceleration, wherein the vehicle acceleration comprises lateral acceleration. In an example, the method utilises the information to forecast future lateral accelerations of the vehicle 10. The information indicative of a requirement for vehicle acceleration may comprise information indicative of a requirement for autonomous vehicle acceleration. The information may be from the autonomous vehicle controller responsible for planning manoeuvres such as cornering. In some examples, the vehicle 10 may be driven non-autonomously and the information may predict a requirement for lateral acceleration, based on sensing of the environment around the vehicle 10, e.g. by an external-facing vision system.

Optional decision blocks are shown. At decision block 504, the method 500 comprises determining a magnitude of the required vehicle acceleration. The method at least requires the magnitude to be above a threshold. If the determination is that the magnitude is above a threshold, the method 500 proceeds. If the determination is that the magnitude is below the threshold, the method 500 terminates at block 514.

In analogy to block 504, the method 500 may determine a duration of the required vehicle acceleration (not shown in the flowchart). The method at least requires the duration to be above a threshold. If the duration is above a threshold, the method 500 proceeds. If the duration is below the threshold, the method 500 terminates. The duration threshold may vary in dependence on magnitude and/or the magnitude threshold may vary in dependence on duration, e.g. via a control map.

At decision block 506, the method 500 comprises determining whether another condition is satisfied. The method at least requires the condition to be satisfied. The condition is associated with a proximity of completion of the vehicle acceleration in the lateral axis to a commencement of a subsequent vehicle acceleration in the lateral axis. If the condition is satisfied, then the suspension angle may not have sufficient time to return to the unmodified state before starting the next motion feedback, so the method 500 will terminate. If the condition is not satisfied, the method 500 continues.

One way of implementing block 506 comprises planning motion feedback for more than one lateral manoeuvre ahead of the vehicle 10. Satisfaction of the condition may require the manoeuvres to be within a threshold proximity. In a specific example, the threshold proximity may define a point of overlap. An overlap is defined when a scheduled time of completion of the motion feedback (completion of a return rotation) for the first manoeuvre occurs after a scheduled time of commencement of the motion feedback for the subsequent manoeuvre. If adjacent motion feedback events do not overlap, the condition is satisfied so the method 500 continues. If they overlap, the condition is not satisfied so the method 500 may terminate. In some examples, the condition may be checked if both manoeuvres satisfy block 504 (sufficient magnitude). In some examples, the condition may be checked if the manoeuvres comprise lateral acceleration in opposite directions (e.g. switchback curve).

At decision block 508, the method 500 comprises determining whether the required lateral acceleration is for positive (e.g. left) or negative (e.g. right) lateral acceleration. This enables the control method 500 to roll (tilt) the vehicle body in the rotation direction that provides a positive superelevation effect on vehicle occupants. A positive superelevation effect increases the head-to-toe component of acceleration and reduces lateral acceleration perceived by vehicle occupants.

Figures 6A, 6B:
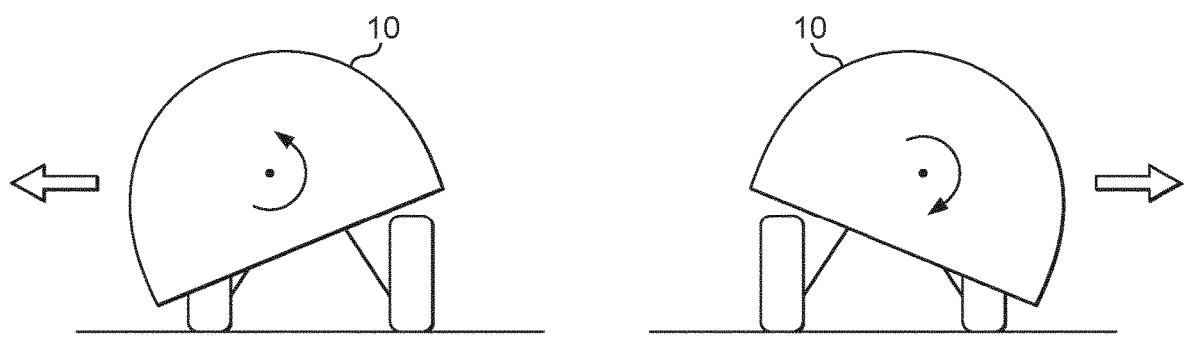
FIG. 6A illustrates an example of a vehicle rolling left to provide a positive superelevation effect for lateral acceleration in a left direction.
FIG. 6B illustrates an example of a vehicle rolling right to provide a positive superelevation effect for lateral acceleration in a right direction.

If the decision is that the lateral acceleration is to the left (positive y-axis), then the method 500 proceeds to block 510 which comprises controlling the active suspension 402 to commence tilting the vehicle body in a first rotation direction (counter-clockwise in FIG. 6A) about the roll axis (x-axis) as shown in FIG. 6A. This reduces lateral acceleration encountered by the vehicle occupant during cornering. In some, but not necessarily all examples, the roll modification makes the vehicle body less parallel to the surface beneath the vehicle body about the roll axis.

If the decision is that the lateral acceleration is to the right (negative y-axis), then the method 500 proceeds to block 512 which comprises controlling the active suspension 402 to commence titling the vehicle body in a second rotation direction (clockwise in FIG. 6B) about the roll axis (x-axis) as shown in FIG. 6B. This reduces lateral acceleration encountered by the vehicle occupant during cornering.

Tilting at blocks 510 and 512 may comprise commencing modifying the angle in the above rotation direction before commencement of the vehicle lateral acceleration, to provide perceptible motion feedback, and then returning to an unmodified angle by commencing modifying the angle in a return rotation direction no earlier than commencement of the vehicle lateral acceleration. Returning to the unmodified angle may be at a different rate. The rate of tilting in the return rotation direction may be different, e.g. slower. In a specific implementation, the rate of tilting in the return rotation direction may be half the speed of the tilting before commencement of the vehicle lateral acceleration. This helps occupants to understand that a return rotation is occurring, as opposed to a new rotation for another corner.

The rate (velocity, acceleration and/or jerk) and/or magnitude (angular displacement) of tilting prior to commencement of the vehicle acceleration at blocks 510 and 512 may optionally be dependent on the magnitude of the lateral acceleration. A first acceleration magnitude may result in a first rate/magnitude of tilt change. A second acceleration magnitude may result in a second rate/magnitude of tilt change. In some examples, the rate/extent of tilting may be proportional to the magnitude of the lateral acceleration. The proportionality may comprise a plurality of levels of granularity. Proportionality enables users to anticipate larger accelerations. The rate/extent of tilting may be limited (saturated) when a predetermined limit (e.g. the second acceleration magnitude) is reached. If the acceleration magnitude reaches a third acceleration magnitude greater than the second acceleration magnitude, the tilt change may be limited to the second rate/magnitude. The predetermined limit may be calibrated to avoid occupant discomfort.

The tilting at blocks 510 and 512 may be accompanied by perceptible audible/visual/haptic feedback into the cabin 300, e.g. via speakers, displays or haptic actuators, to increase passenger anticipation of lateral acceleration. The additional feedback may be output at a predetermined time before the acceleration According to the above method 500, at least the motion feedback commences before the lateral acceleration commences. The tilting may commence at a predetermined time before commencement of the vehicle acceleration, wherein the predetermined time is from the range approximately 0.5 seconds to approximately 2 seconds. The lower limit provides sufficient time for users to anticipate the upcoming corner. The upper limit accounts for the uncertainty of planning manoeuvres in unknown environments, and may even be 1 second or less for fast-changing environments. The predetermined time may be a fixed single value or may be variable.

In an alternative to the above method 500, the tilting may commence at the same time as, or after commencement of the lateral acceleration, to provide active superelevation reactively but without advance motion feedback. Therefore, according to an aspect of the invention there is also a provided a method comprising: receiving information indicative of a requirement for positive or negative vehicle acceleration in a first axis, wherein the first axis is a lateral axis; and controlling the active suspension 402 to commence modifying an angle of the vehicle body about a second axis perpendicular to the first axis in dependence on the receiving an indication, wherein the second axis is a longitudinal axis and the angle is roll.

The lateral acceleration itself may be controlled to be smooth. For example, a speed and path of the vehicle 10 may be autonomously controlled to minimize a comfort cost function and/or to avoid exceeding a predetermined acceleration threshold and/or jerk threshold.

Motion Feedback for Longitudinal Acceleration

Referring now to the longitudinal acceleration control method 700 of FIG. 7, the method 700 provides motion feedback before commencement of positive or negative longitudinal vehicle acceleration, to prepare and inform occupants of the upcoming acceleration.

The method 700 commences at block 702, with receiving information indicative of a requirement for vehicle acceleration, wherein the vehicle acceleration comprises longitudinal acceleration. In an example, the information forecasts future longitudinal accelerations of the vehicle 10. The information indicative of a requirement for vehicle acceleration may comprise information indicative of a requirement for autonomous vehicle acceleration. The information may be from the autonomous vehicle controller responsible for planning manoeuvres such as acceleration and braking. In some examples, the vehicle 10 may be driven non-autonomously and the information may predict a requirement for longitudinal acceleration, based on sensing of the environment around the vehicle 10, e.g. by an external-facing vision system.

Optional decision blocks are shown. At decision block 704, the method 700 comprises determining whether the acceleration is associated with transitioning between a stopped state of the vehicle 10 and a moving state of the vehicle 10. In this example, the method 700 at least requires this transition. If the determination is that the acceleration is associated with transitioning between a stopped state and a moving state, the method 700 proceeds. If the determination is that the acceleration is not associated with transitioning between a stopped state and a moving state, the method 700 terminates at block 714.

As a result of block 704, the method 700 is only performed when accelerating from a stop and/or when decelerating to a stop. Accelerating from/to a stop is associated with higher jerk, for example due to friction brakes grabbing and/or due to torque path lash crossings, so early motion feedback is more advantageous.

In an alternative implementation, block 704 is omitted and the motion feedback is applied regardless of whether the vehicle 10 is stopping. The vehicle 10 may be moving before and after the acceleration.

At decision block 706, the method 700 comprises determining a magnitude of the required vehicle acceleration. The method 700 at least requires the magnitude to be above a threshold. If the determination is that the magnitude is above a threshold, the method 700 proceeds. If the determination is that the magnitude is below the threshold, the method 700 terminates at block 714.

In analogy to block 706, the method 700 may determine a duration of the required vehicle acceleration (not shown in the flowchart). The method 700 at least requires the duration to be above a threshold. If the duration is above a threshold, the method 700 proceeds. If the duration is below the threshold, the method 700 terminates. The duration threshold may vary in dependence on magnitude and/or the magnitude threshold may vary in dependence on duration, e.g. via a control map.

At decision block 708, the method 700 comprises determining whether the requirement is for positive (e.g. forward acceleration) or negative (e.g. deceleration/retardation) acceleration. This enables the control method 700 to pitch the vehicle body in a specific rotation direction to indicate whether the upcoming acceleration is positive or negative. The pitching reduces non-vertical acceleration components at the users to reduce head jerk.

Figure 8A:
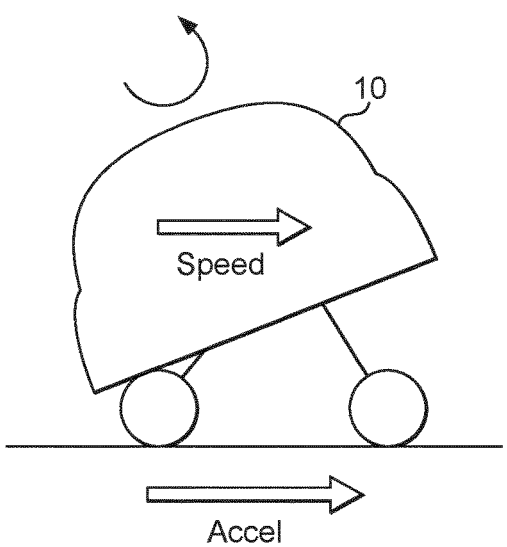
FIG. 8A illustrates an example of a vehicle pitching in a first rotation direction for positive longitudinal acceleration.

If the decision is that the longitudinal acceleration is positive (positive x-axis), then the method 700 proceeds to block 710 which comprises controlling the active suspension 402 to commence pitching the vehicle body in a first rotation direction about the pitch axis (y-axis) as shown in FIG. 8A. In some, but not necessarily all examples, the pitch modification makes the vehicle body less parallel to the surface beneath the vehicle body about the pitch axis. Pitching the vehicle body provides motion feedback and reduces longitudinal acceleration encountered by the vehicle occupant during the acceleration. According to FIG. 8A, the first rotation direction is a squatting direction (rear lowers and/or front rises), in accordance with the physics of weight transfer under positive acceleration. However, occupants less familiar with vehicle physics may find it more intuitive if the first rotation direction is a diving direction (rear rises and/or front lowers). Therefore, the first rotation direction may be squatting or diving depending on implementation.

Figure 8B:
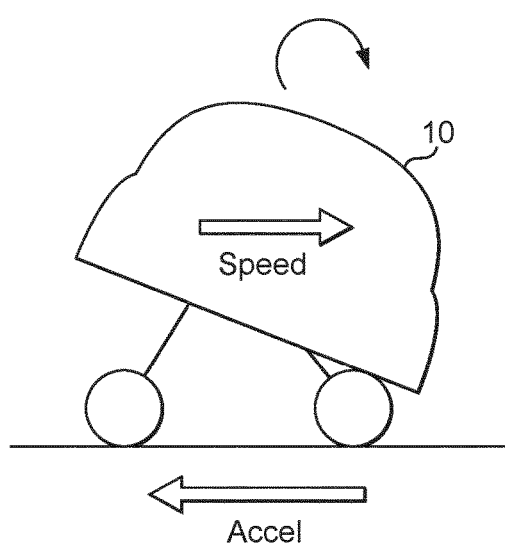
FIG. 8B illustrates an example of a vehicle pitching in a second rotation direction for negative longitudinal acceleration.

If the decision is that the longitudinal acceleration is negative (negative x-axis), then the method 700 proceeds to block 712 which comprises controlling the active suspension 402 to commence pitching the vehicle body in a second rotation direction about the pitch axis (y-axis) as shown in FIG. 8B. The second rotation direction is opposite to the first rotation direction. Pitching the vehicle provides motion feedback and reduces longitudinal deceleration encountered by the vehicle occupant during the deceleration.

Pitching at blocks 710 and 712 may comprise commencing modifying the angle in the above first rotation direction before commencement of the vehicle acceleration, to provide motion feedback, and then returning to an unmodified angle by commencing modifying the angle in a return rotation direction no earlier than commencement of the vehicle acceleration. Returning to the unmodified angle may be at the same or a different rate.

The rate of modification of the pitch at blocks 710 and 712 is controlled to provide perceptible motion feedback, to trigger biological closed loop balance control. According to an example, the average rate of modification of the pitch in the first rotation direction is approximately 2 degrees per second, or a value 1 degree either side of 2 degrees, for most implementations. Different implementations call for different rates, and in an example the rate is a value from the range approximately 0.5 degrees per second to approximately 5 degrees per second, to provide perceptible motion feedback without excessive z-axis motions such as heave.

The rate (velocity, acceleration and/or jerk) and/or magnitude (angular displacement) of pitching in the first rotation direction towards the modified angle at blocks 710 and 712 may optionally be dependent on the magnitude of the longitudinal acceleration. A first acceleration magnitude may result in a first rate/magnitude of pitch change. A second acceleration magnitude may result in a second rate/magnitude of pitch change. In some examples, the rate/extent of pitching may be proportional to the magnitude of the longitudinal acceleration. The proportionality may comprise a plurality of levels of granularity. Proportionality enables users to anticipate larger accelerations. The rate/extent of tilting may be limited (saturated) when a predetermined limit (e.g. the second acceleration magnitude) is reached. If the acceleration magnitude reaches a third acceleration magnitude greater than the second acceleration magnitude, the pitch change may be limited to the second rate/magnitude. The predetermined limit may be calibrated to avoid occupant discomfort.

The pitching at blocks 710 and 712 may be accompanied by perceptible audible/visual/haptic feedback into the cabin 300, e.g. via speakers, displays or haptic actuators, to increase passenger anticipation of longitudinal acceleration. The additional feedback may be output once the door 304 has been closed and at a predetermined time before the acceleration.

According to the above method 700, at least the motion feedback commences before the longitudinal acceleration commences. The pitching may commence at a predetermined time before commencement of the vehicle acceleration, wherein the predetermined time is from the range approximately 0.5 seconds to approximately 2 seconds. The lower limit provides sufficient time for users to anticipate the upcoming longitudinal acceleration. The upper limit accounts for the uncertainty of planning manoeuvres in unknown environments, and may even be 1 second or less for fast-changing environments. The predetermined time may be a fixed single value or may be variable. The predetermined time for longitudinal acceleration may be the same as or different from the predetermined time for lateral acceleration.

The longitudinal acceleration itself may be controlled to be smooth. For example, a speed and path of the vehicle 10 may be autonomously controlled to minimize a comfort cost function and/or to avoid exceeding a predetermined acceleration threshold and/or jerk threshold.

The longitudinal and lateral acceleration control methods 500, 700 described above may be combinable for combined tilting and pitching such as simultaneous tilting and pitching, to further improve anticipation of acceleration and further reduce non-vertical head acceleration.

Compensation for Shifting Cabin Load

Figure 9:
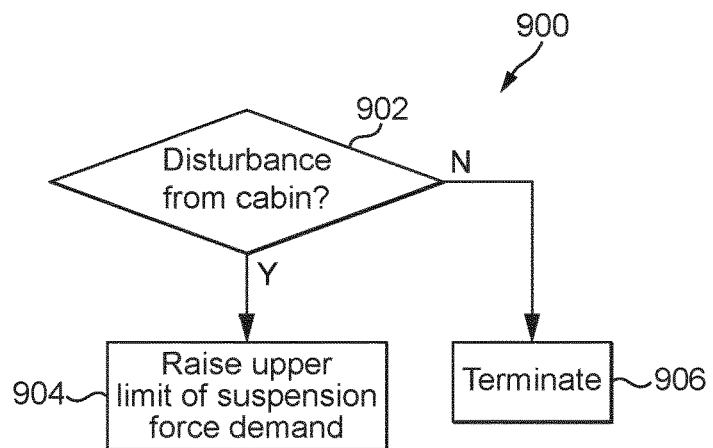
FIG. 9 illustrates an example of a control method.

FIG. 9 illustrates another control method 900 that improves occupant comfort, according to a further aspect of the invention. FIG. 9 is an example of implementing a method 900 comprising:
  determining whether a transient suspension disturbance is from within a cabin 300 of the vehicle 10 (block 902); and
  controlling a variable force parameter of the active suspension 402 in dependence on whether the transient suspension disturbance is from within the cabin 300 of the vehicle 10 (block 904).

A suspension disturbance is a force which is transmitted through the active suspension 402. The force is a transient disturbance when the force associated with at least one vehicle wheel changes. A transient suspension disturbance may correspond to a single change in force, an irregular sequence of forces, or may have a frequency associated therewith.

In a use case, occupants prefer for vehicles not to rock when weight shifts around inside the cabin 300. The rocking can advantageously be near-eliminated using the variable force parameter. However, if the variable force parameter is controlled to the same extent for sources of suspension disturbance outside the cabin 300, the vehicle cabin 300 may feel too isolated from the road which could influence motion sickness. Motion sickness can be mitigated by allowing some cabin movement in dependence on external sources of suspension disturbance such as road undulations, potholes, bumps, textures, etc.

The method 900 of FIG. 9 commences at block 902, which comprises determining whether a transient suspension disturbance is from within a cabin 300 of the vehicle 10. If the determination is that the transient suspension disturbance is from within the cabin 300, the method 900 continues. If the determination is that the transient suspension disturbance is not from within the cabin 300 (e.g. external/unknown), the method 900 terminates at block 906.

The transient suspension disturbance may be a detected or a predicted transient suspension disturbance. The control system 2 may comprise a predictive controller for controlling the active suspension 402 predictively based on predicted transient suspension disturbances. The control system 2 may comprise a reactive controller for controlling the active suspension 402 reactively based on detected transient suspension disturbances. The control system 2 may comprise both predictive and reactive controllers, wherein the reactive controller compensates for incorrect predictions by the predictive controller. The method 900 of FIG. 9 may be implemented using a predictive controller, a reactive controller, or a combination thereof.

In an example, the method 900 may determine whether the disturbance is from within a cabin 300 of the vehicle 10 when the transient suspension disturbance exceeds a threshold magnitude and/or a threshold rate of suspension disturbance. The method 900 may at least require the magnitude/rate to be above a threshold.

Detecting or predicting a transient suspension disturbance is enabled using appropriate sensors. Examples are provided.

An IMU 408 can be monitored to detect roll, pitch and/or heave of the vehicle body. Signals from wheel-to-body displacement sensors 404 can also detect transient suspension disturbance. The raw signals are agnostic to the source of the suspension disturbance. However, the signals could be compared with reference data to determine the source. The control system may record IMU/displacement data for the vehicle 10 over time while the vehicle 10 is empty, to provide the reference data. The control system may compare data for the vehicle 10 while populated with the reference data for the vehicle 10 while empty, and look for discrete disturbances in pitch, roll and/or heave, and/or wheel-to-body displacement.

If a cabin sensor 410 such as a camera is present, image analysis may be performed to identify a source of the detected or predicted disturbance. For example, an object such as a person or cargo may be identified. A movement identifier such as a vector may be associated to the object. Based on the movement identifier, a detected or predicted transient suspension disturbance from the cabin 300 can be determined.

Other cabin sensors 410 include vehicle occupancy sensors such as seatbelt sensors, seat weight pressure sensors, and floor pressure sensors. Undoing a seatbelt and/or changing seat weight corresponds to a source of detected or predicted transient suspension disturbance at a known location within the vehicle 10. Another cabin sensor 410 includes a sound sensor.

Information from a user interface 412 could be used. For example, a user device may indicate its presence (along with the user) within the vehicle. Pressing a door open/close button may indicate a detected or predicted transient suspension disturbance.

In some examples, the control system 2 may identify whether the source of the transient suspension disturbance was external to the cabin 300, in order to determine whether the source was from the cabin 300. Analysis of the IMU 408 and/or wheel-to-body displacement sensors 404 may identify external sources. Localization sensors 406 enable external sources of transient suspension disturbance to be detected/predicted. Wind speed and/or direction sensors can be used to determine a contribution of wind to cabin motion.

In some examples, the control system 2 may monitor expected transient suspension disturbance associated with manoeuvre planning, in order to determine whether the source was from the cabin 300. The expected transient suspension disturbance may comprise expected cornering and/or acceleration and/or braking and/or speed of the vehicle 10. The manoeuvre planning is performed using the localization sensors 406. If the control system 2 associates the transient suspension disturbance with an expected transient suspension disturbance by comparison, then the transient suspension disturbance is not from the cabin 300.

In some examples, the determination for block 902 may be made deterministically based on at least one sensor that is not agnostic to a source of the disturbance. The above-described cabin sensors 410 and/or user interface 412 enable a deterministic approach.

In some examples, the determination for block 902 may be made probabilistically. The determination may be dependent on multiple sensing modes (combinations of the above sensors/analysis). The determination may comprise combining a combined probability from the multi-modal information with probability thresholds associated with different sources of transient suspension disturbance.

If the transient suspension disturbance is from within the cabin 300, the method 900 proceeds to block 904. Block 904 comprises controlling the variable force parameter of the active suspension 402. The variable force parameter may be the above-described force demand.

The force demand itself may remain agnostic to whether the transient suspension disturbance is from within the cabin 300 or external. However, controlling the force demand at block 904 may comprise changing an upper limit of the force demand. The change of the upper limit may be an increase. Increasing the upper limit advantageously enables the control system 2 to control cabin-induced rocking while responding consistently to other lesser disturbances, increasing occupant comfort. If a cabin-induced disturbance is less severe than predicted, the limit will not be reached and the vehicle 10 will continue to behave predictably. Occupants may not notice any compromise in vehicle behaviour, and may perceive that they are in a vehicle 10 that inherently does not rock when an occupant/cargo moves. This lack of rocking provides the sensation of being in a high-mass vehicle like a bus, which is advantageous for customer acceptance of smaller-sized autonomous transit vehicles. However, in an alternative implementation of the method 900, block 904 may increase the force demand itself.

Raising the upper limit may comprise raising the upper limit for spring force and/or for damping force, depending on which part of the active suspension is active. An upper limit for spring force may be the same as or different from the upper limit for damping force.

Energy Saving Mode

Figure 10:
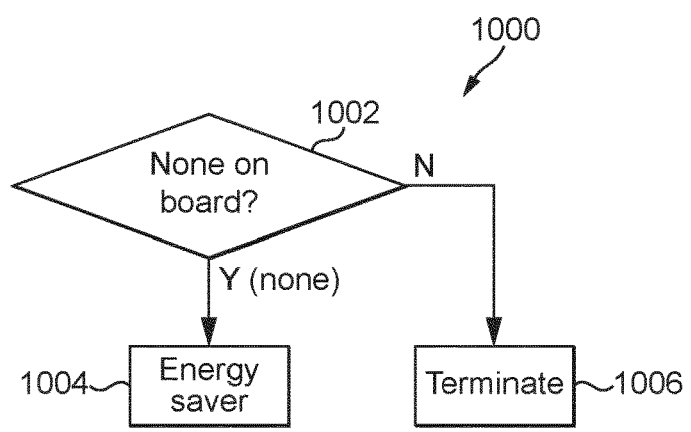
FIG. 10 illustrates an example of a control method.

FIG. 10 illustrates another control method 1000 that improves occupant comfort, according to a further aspect of the invention. The control method 1000 comprises:

determining whether no occupants are on board the vehicle 10 (block 1002); and reducing the variable force parameter when the determination is that no occupants are on board the vehicle 10 (block 1004) and not reducing the variable force parameter when the determination is not that non occupants are on board the vehicle 10 (block 1006). Block 1006 may lead to performing the other control methods described herein.

Determining whether no occupants are on board the vehicle 10 can be performed using cabin sensors 410 and/or user interfaces and/or wheel-to-body displacement sensors 404. For example, no occupants are on board when: image analysis of cabin camera images recognizes no occupants; seat weight sensors all indicate below-threshold weights; seatbelt sensors all indicate undone seatbelts; no user-dependent (passenger-dependent) journey requirement is active; a wheel-to-body displacement satisfies a no-load condition; etc.

Reducing the variable force parameter may comprise reducing the force demand(s) (gains). Reducing gain(s) such as skyhook/groundhook gains reduces energy consumption. For example, in a pump-controlled fluid active suspension, lower gain requires less use of the pump. The gain(s) may be reduced to a non-zero lower value. In some examples, reducing the variable force parameter may comprise causing the pump to be deactivated.

Stability Against Resonant Disturbances

Figure 11:
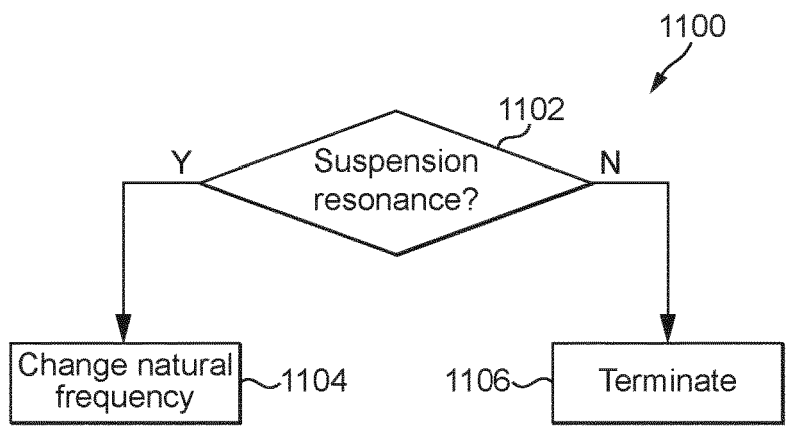
FIG. 11 illustrates an example of a control method.

FIG. 11 illustrates another control method 1100 that improves vehicle stability, according to a further aspect of the invention. The control method 1100 comprises:

determining whether the transient suspension disturbance is associated with mechanical resonance (block 1102); and controlling the variable force parameter to change a natural frequency associated with the active suspension 402 when the determination is that the transient suspension disturbance is associated with mechanical resonance (block 1104), and not controlling the variable force parameter to change the natural frequency when the determination is not that the transient suspension disturbance is associated with mechanical resonance (block 1106).

This control method 1100 changes the natural frequency to a natural frequency that is not a harmonic of the mechanical resonance. This makes the vehicle 10 more difficult to tip over, for example by vandals or rioters. Fully driverless vehicles may be more susceptible to deliberate damage than vehicles with a driver, due to a lack of supervision.

Determining whether the transient suspension disturbance is associated with a mechanical resonance can be implemented in various ways. Time-variation of IMU 408 and/or wheel-to-body displacement signals may be analysed using temporal analysis to detect mechanical resonance.

In some implementations, the association may be made by determining a source of transient suspension disturbance. If the source comprises pushing of a body 302 of the vehicle 10, the association is made. Detecting pushing can be achieved using image analysis of images from the cabin camera (through transparent windows) and/or an external-facing vision system, and/or using pressure sensors on the vehicle body 302/in the vehicle cabin 300.

Block 1104 may be performed if oscillations are detected to be increasing in magnitude, as part of the mechanical resonance. If the oscillations are decreasing or not increasing, the control system 2 may determine not to perform block 1104, at least unless/until the oscillations increase in magnitude.

Controlling the variable force parameter to change a natural frequency associated with the active suspension 402 can be implemented in various ways. Changing a natural frequency may comprise changing the force demand for at least one vehicle wheel. The force demand may correspond to a spring force and/or a damping force. The natural frequency may be changed once or a plurality of times in response to a single determination. In some examples, the natural frequency may be changed a plurality of times within a predetermined time period.

The change of natural frequency may be arbitrary or according to a closed loop control process. In some examples, the modified natural frequency may be controlled to be out of phase with the mechanical resonance based on closed-loop feedback. The closed loop control process may comprise determining a required force demand for providing peak resistance to mechanical resonance amplification, and then providing that force demand.

Horizontal Platform on Slopes

Figure 12:
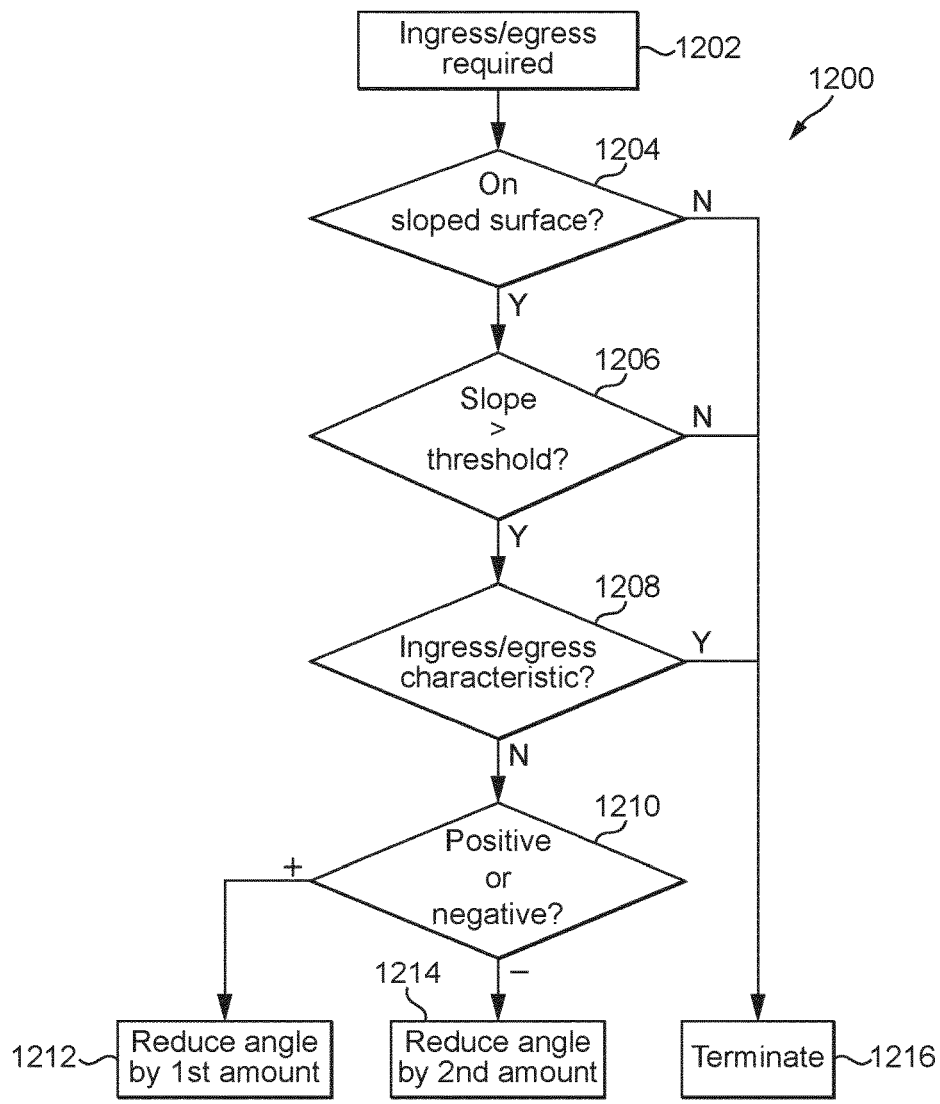
FIG. 12 illustrates an example of a control method.

FIG. 12 illustrates another control method 1200 that improves vehicle accessibility, according to a further aspect of the invention. The control method 1200 at least comprises:
receiving information indicative of a requirement for ingress/egress of passengers and/or cargo (block 1202);
receiving information indicative that the ingress/egress is to occur with the vehicle 10 on a sloped surface 1300 (block 1204); and
controlling the active suspension 402 to reduce an angle of the vehicle body relative to horizontal, for the ingress/egress on the sloped surface 1300 (block 1212 or 1214).

The method 1200 enables the vehicle 10 to provide a level platform that is horizontal to the horizon, before ingress/egress, e.g. before the door 304 opens. This makes ingress and egress easier on steep hills, and prevents cargo from sliding or rolling. The ability to provide a level platform is constrained by maximum suspension travel.

Figures 13A, 13B:
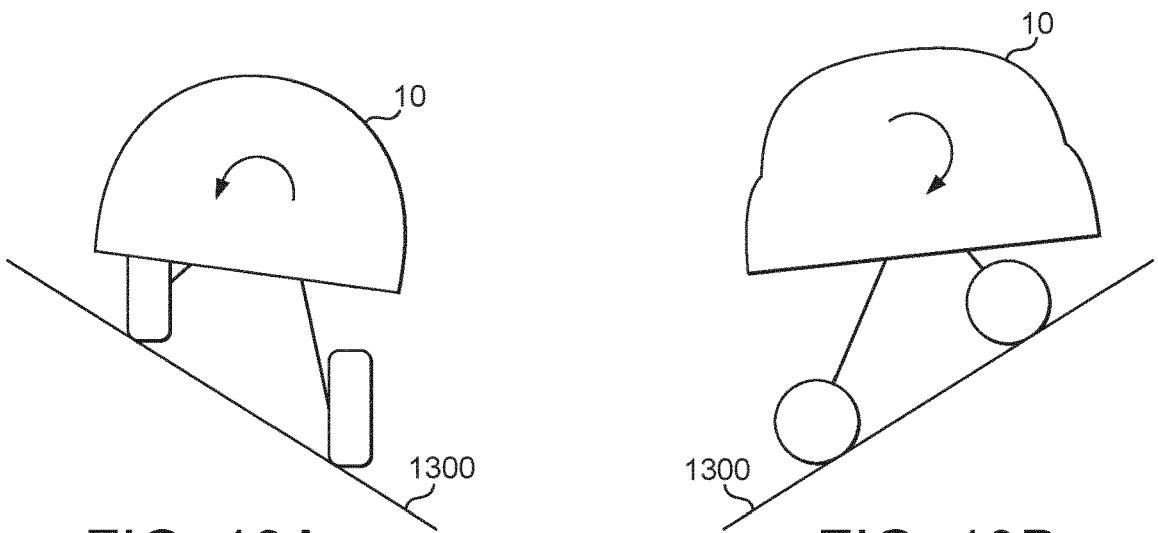
FIG. 13A illustrates an example of a vehicle providing a horizontal ingress/egress platform on a transverse slope.
FIG. 13B illustrates an example of a vehicle providing a horizontal ingress/egress platform on a longitudinal slope.

The sloped surface 1300 may comprise a transverse slope wherein the active suspension 402 is configured to tilt the vehicle body about the roll axis (x-axis) to reduce the angle of the vehicle body relative to horizontal as shown in FIG. 13A. Additionally or alternatively, the sloped surface 1300 may comprise a longitudinal slope wherein the active suspension 402 is configured to pitch the vehicle body about the pitch axis (y-axis) to reduce the angle of the vehicle body relative to horizontal as shown in FIG. 13B.

There are various methods to determine a requirement for ingress/egress. For example, the user interface 412 may enable a user to request ingress/egress. The user may press an ingress/egress request button. The user may press a door open/close button. The user's request may be from a human-machine interface of the vehicle 10 or from their user device. The user may or may not be an occupant of the vehicle 10, depending on whether the request is for ingress or for egress.

The requirement for ingress/egress may be determined based on other user-dependent information such as journey requirements. For example, a navigation function of the control system 2 may determine that the vehicle 10 has reached a destination (e.g. geofence) specified by a journey requirement.

Once an indication of the requirement has been received, the method 1200 receives, for block 1204, information indicative that the ingress/egress is to occur with the vehicle 10 on a sloped surface 1300. For example, the information may be based on monitoring of the driving environment by localization sensors 406. The information may be based on monitoring of map data comprising slope information.

Decision block 1204 may comprise determining whether the ingress/egress is to occur with the vehicle 10 on a sloped surface 1300. If the ingress/egress is to occur with the vehicle 10 on a sloped surface 1300, the method 1200 continues. If not, the method 1200 terminates at block 1216, and maintains an angle substantially parallel to the non-sloped surface for ingress/egress.

The determination of block 1204 may be reactive or predictive. A predictive determination enables the active suspension 402 to be controlled gently while the vehicle 10 is still moving. A reactive determination may be performed while the vehicle 10 is close to stopping or stopped.

Making a reactive determination may comprise monitoring signals using an inclinometer. Accelerometers of the IMU 408 may function as an inclinometer. Making a predictive determination may be performed based on determining an ingress/egress location within the driving environment, and determining a slope at the ingress/egress location. Determining whether the surface is sloped may comprise monitoring the inputs from the localization sensors 406, and/or interrogating map data with slope information.

Decision block 1206 comprises determining a magnitude of slope of the surface. The method 1200 at least requires the magnitude to be above a threshold. If the magnitude is above a threshold, the method 1200 continues. If the magnitude is below the threshold, the method 1200 terminates. This is because a level platform is more beneficial for steeper slopes. The magnitude may be determined from the IMU 408, the map data, the localization sensor 406, or a combination thereof.

Decision block 1208 comprises polling for information indicative of at least one ingress/egress characteristic. In this example, the method 1200 at least requires no such information to be obtained by the polling. If no such information is obtained, the method 1200 continues. If the information is obtained, the method 1200 terminates. The method continues when there is no user-based reason to maintain an angle parallel to the sloped surface 1300.

One example of information indicative of at least one ingress/egress characteristic comprises a wheel ingress/egress requirement associated with wheeling an object onto/off the vehicle. Wheeling an object such as a person, cargo or pushchair frame onto the vehicle 10 may require a ramp. In some examples, the wheel ingress/egress requirement may be a wheelchair ingress/egress requirement and/or a pushchair ingress/egress requirement. Human-machine interface(s) at the vehicle 10 and/or at a user device may be configured to enable user to input the wheel ingress/egress requirement. If the user makes the input, then the condition is not satisfied and the method 1200 terminates. Alternatively, image processing of images from a cabin camera or external-facing vision system may be used to detect the wheel ingress/egress requirement, by recognizing an object such as a wheelchair or pushchair.

Another example of information indicative of at least one ingress/egress characteristic comprises a loading/unloading of cargo requirement associated with loading cargo onto/off the vehicle. The loading/unloading of cargo requirement may comprise a loading/unloading of cargo by hand requirement and/or a loading/unloading of cargo by machine requirement. Loading cargo by hand is easier when a cargo area access point (e.g. door) is low to the ground. Loading cargo by machine is easier if the vehicle body is at the same angle as the machine. The machine may be a forklift truck or other machine. A dedicated human-machine interface(s)

may be provided to enable user to input the loading/unloading of cargo requirement. If the user makes the input, then the condition is not satisfied and the method 1200 terminates. Alternatively, image processing of images from a cabin camera or external-facing vision system may be used to detect whether loading/unloading of cargo is taking place, and if so whether the cargo is loaded/unloaded by hand or by machine.

Decision block 1210 comprises determining whether the surface slopes in a first direction or in a second opposite direction. In an example, the first direction may be uphill on a longitudinal slope. The second direction may be downhill on a longitudinal slope. The active suspension 402 may be controlled differently based on whether the surface slopes uphill or downhill, as shown. In an alternative implementation, the amount by which the angle is changed is agnostic to the direction of the slope.

If the surface slopes uphill, the method 1200 proceeds to block 1212 which controls the active suspension 402 to reduce the angle of the vehicle body relative to horizontal up to a first limit. If the surface slopes downhill, the method 1200 proceeds instead to block 1214 which controls the active suspension 402 to reduce the angle of the vehicle body relative to horizontal up to a second limit. The second amount may be less than the first amount, to ensure that occupants can still see the ground out of a front window of the vehicle 10, to reduce disorientation.

Controlling the active suspension 402 as described for blocks 1212 and 1214 may comprise determining a difference in angle between the vehicle and horizontal (e.g. virtual horizon associated with inclinometer). The control system 2 may be configured to determine the difference and control the active suspension 402 to reduce the difference. Whether the difference can be eliminated is constrained by maximum suspension travel.

The control of the active suspension 402 to reduce the angle may commence after the vehicle 10 has stopped, or a threshold time before the vehicle 10 has stopped.

Kerb Matching and Kneeling

Figure 14:
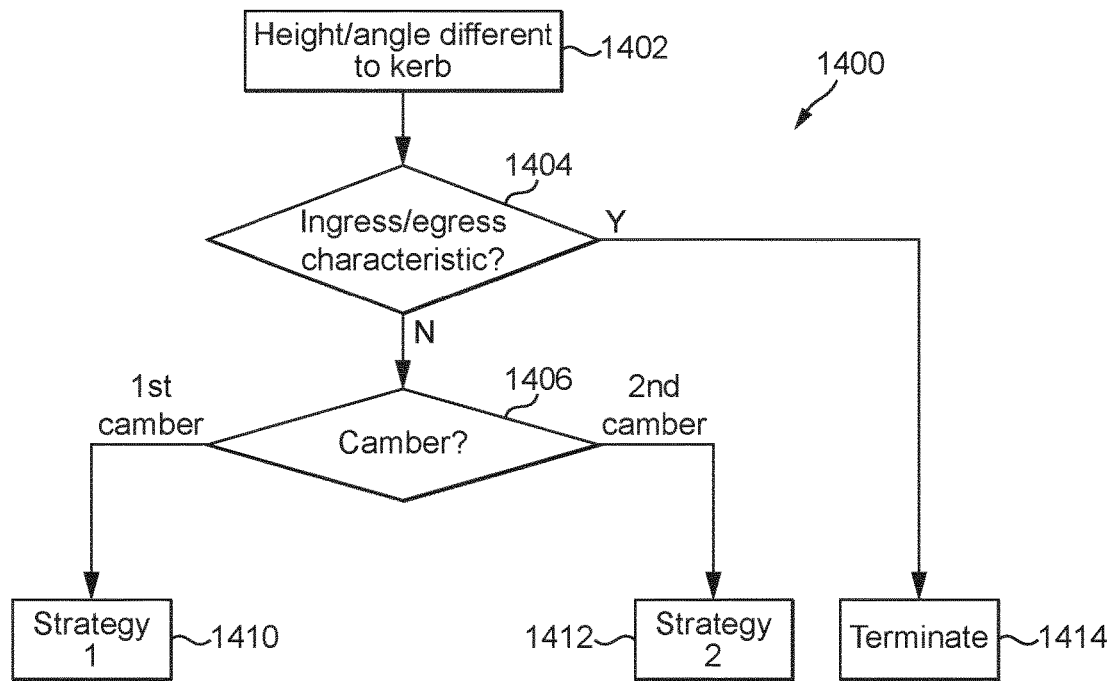
FIG. 14 illustrates an example of a control method.

FIG. 14 illustrates another control method 1400 that improves vehicle accessibility, according to a further aspect of the invention. The control method 1400 at least comprises:
  determining a difference in height and/or a difference in angle, between the vehicle body and an ingress/egress surface 1500 (block 1402); and
  controlling the active suspension 402 to reduce the difference in height, and/or controlling the active suspension 402 to reduce the difference in angle of the vehicle body (block 1410 or 1412).

The above method 1400 provides a kneeling function to reduce the size of step a user will have to take for ingress/egress. The ingress/egress surface 1500 may be the pavement (sidewalk) or other location from which the user will step on or off the vehicle 10, and which is not under the vehicle 10. The ingress/egress surface 1500 may be approximated by detecting a kerb. Alternatively, the ingress/egress surface 1500 may be determined by recognizing a pavement surface and/or recognizing where people are standing via external-facing vision systems. The location of the ingress/egress surface 1500 may be determined based on journey requirements (destination/pickup location), as well as localization information to find an appropriate place to pull over.

Using the kerb example, the method 1400 may decrease ride height for lower kerbs. The method 1400 may increase ride height for higher kerbs. The vehicle body roll angle may be adjusted to match a camber of the ingress/egress surface 1500, and/or pitch to match a longitudinal slope of the ingress/egress surface 1500, if the angle is different from the surface on which the vehicle 10 stops for ingress/egress. Often, pavements have a different camber from roads, and kerbs regularly rise and fall relative to the road surface.

The method 1400 may optionally be performed as well as the method 1200 of FIG. 12. If so, then reducing the difference in angle may be controlled to avoid opposing block 1212 or 1214 (reducing the angle to horizontal). For example, reducing the difference in angle may be about one axis (e.g. x-axis, roll) while reducing the difference to horizontal of the method 1200 of FIG. 12 is about another axis (e.g. y-axis, pitch).

Determining a difference in height/angle between the vehicle body and the ingress/egress surface 1500 can be performed in various ways. The location of the ingress/egress surface 1500 may be determined. Information indicative of the height/angle of the ingress/egress surface 1500 may be determined. A 3D point cloud/depth map or other localization information may be used. For kerbs, simpler kerb height detectors also exist. Information indicative of the height/angle of the vehicle body at the location 10 for ingress/egress may be determined in a similar way. The difference in height and/or angle may be determined. Optionally, the difference may at least need to exceed a minimum threshold in order for the method 1400 to proceed.

Optional decision block 1404 polls for information indicative of at least one ingress/egress characteristic, similarly to block 1208 of the method 1200 of FIG. 12.

Figure 15A:
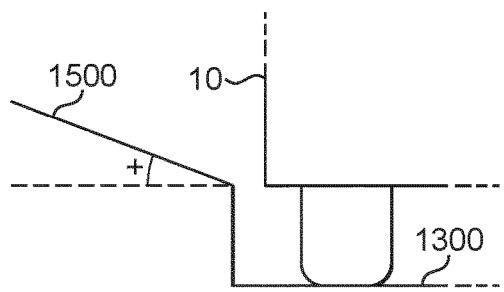
FIG. 15A illustrates an example of a vehicle not tilting to match a camber of an ingress/egress surface.
Figure 15B:
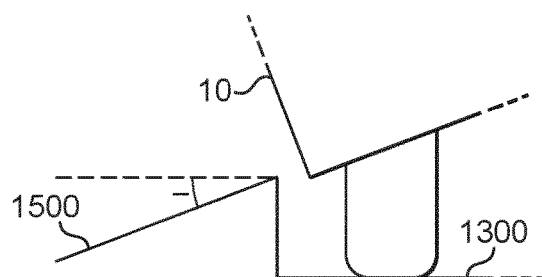
FIG. 15B illustrates an example of a vehicle tilting to match a camber of an ingress/egress surface.

Optional block 1406 comprises receiving information indicative of a camber of the ingress/egress surface 1500. A camber refers to a lateral slope away from the side of the vehicle 10, for example a slope in a y-axis direction if the vehicle 10 is parallel-parked and facing forwards in the x-axis. The camber information may be determined using the techniques mentioned above for block 1402. The active suspension 402 may be controlled differently in dependence on the camber. For example, If the camber is downwards (negative z-axis with increasing y-axis distance from the vehicle 10), the method 1400 may reduce the difference in angle as shown in FIG. 15B, to reduce step distance from the vehicle. If the camber is positive (positive z-axis with increasing y-axis distance from the vehicle 10), the method 1400 may terminate at block 1410 without reducing the difference in angle, as shown in FIG. 15A, or may reduce the difference in angle to a lesser extent. In an alternative implementation, the difference in angle is agnostic to the direction of camber, and/or the angle is not changed at all.

Inductive Charging

Figure 16:
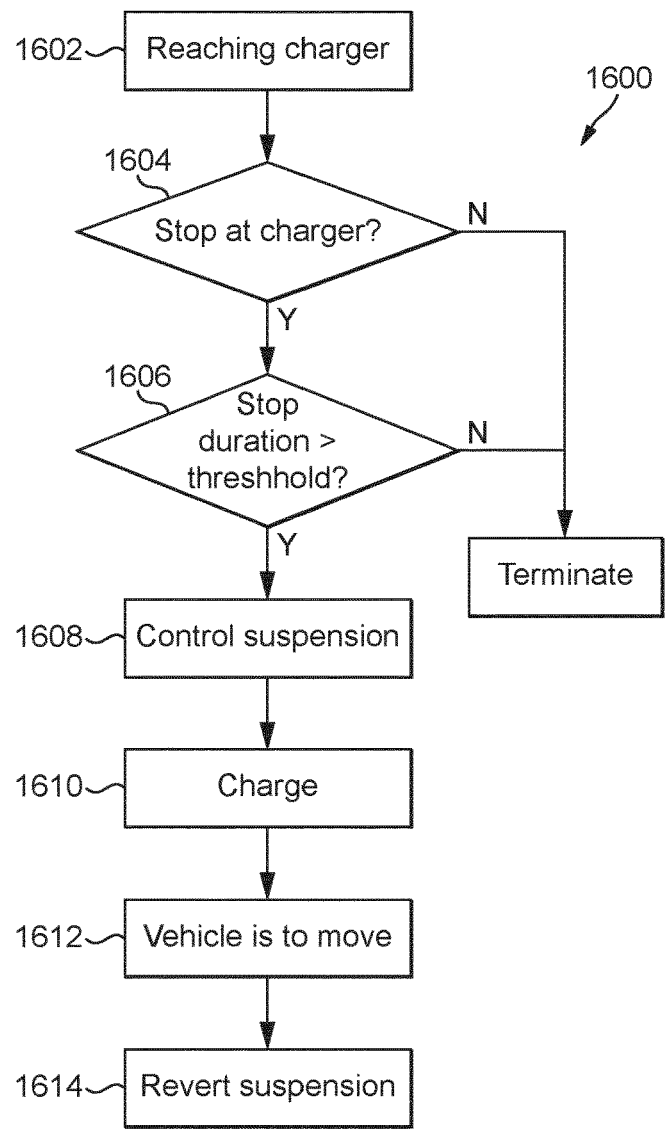
FIG. 16 illustrates an example of a control method.
Figure 17:
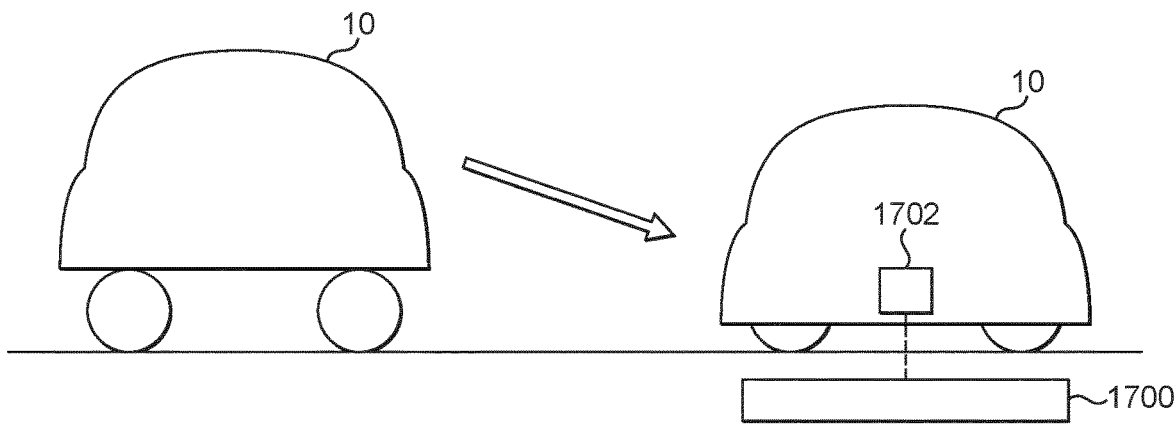
FIG. 17 illustrates an example of a vehicle lowering its ride height while approaching a traction battery charging interface.

FIG. 16 illustrates another control method 1600 that improves vehicle comfort, according to a further aspect of the invention. The control method 1600 at least comprises:
  receiving information indicative that the vehicle 10 is to reach a traction battery charging interface 1700 (block 1602); and
  controlling the active suspension 402 to commence modifying a height and/or angle of the vehicle body relative to the plurality of wheels towards a required height and/or angle associated with traction battery charging as the vehicle 10 approaches the traction battery charging interface 1700 and before the vehicle 10 has reached the traction battery charging interface 1700, in dependence on the receiving information (block 1608), as illustrated in FIG. 17.

In some, but not necessarily all examples, the traction battery charging interface 1700 is configured for wireless inductive charging. The charging interface 1700 may comprise a charging pad. The charging interface may comprise a charging coil which may be mounted to the underside of the vehicle body and be arranged to inductively couple with the charging pad in order to charge the traction battery. The required height/angle may be a setpoint for wireless inductive charging. The setpoint may be for optimizing resonant inductive coupling. The setpoint height/angle provides the highest charging efficiency. Modifying not just the height but also the angle advantageously enables efficient charging on rough and uneven surfaces, such as public roads.

The charging interface 1700 may be located on or under the road surface on which the vehicle 10 is travelling. The charging interface 1700 may be located at a waiting location where the vehicle 10 often stops temporarily, such as a taxi rank or a queuing area for traffic lights. During each journey of the vehicle 10, the vehicle 10 may encounter a plurality of charging interfaces 1700. Therefore, the traction battery 312 can receive regular, small charge boosts throughout its journey while stopped. This is useful for keeping vehicles such as taxis in continuous operation for longer. However, occupants may notice if the height/angle commences changing after the vehicle 10 has reached the charging interface 1700. This may be unexpected and not comfortable. Therefore, the height/angle commences changing before the vehicle 10 has reached the charging interface 1700.

For block 1602, receiving information indicative that the vehicle 10 is to reach a traction battery charging interface 1700 may be implemented in various ways. The control system 2 may determine whether the vehicle 10 is reaching a charging interface 1700. If so, the method 1600 may continue. If not, the method 1600 may terminate. Charging interface 1700 locations may be indicated in map data, or via sign recognition from external-facing vision system data, for example. A route of the vehicle 10 may be known from manoeuvre planning and user-dependent journey requirements. The route can be matched to charging interface locations. The vehicle 10 may be determined to be reaching the charging interface 1700 in dependence on the vehicle 10 reaching a threshold proximity to the charging interface 1700. In this example The method 1600 at least requires the vehicle 10 to reach the threshold proximity. The threshold proximity may be defined using a geofence, a time taken to reach the charging interface 1700, or a combination thereof.

The method 1600 comprises optional decision blocks. Block 1604 comprises determining whether the vehicle 10 is able to stop for traction battery charging via the charging interface 1700. If so, the method 1600 continues. If not, the method 1600 terminates. This decision is implemented if the vehicle 10 must be stopped for charging to take place. In an implementation, future stopped locations of the vehicle 10 are known from autonomous manoeuvre planning. If a stopped location coincides with a charging interface location, the method 1600 continues. A stopped location may be determined in dependence on monitored traffic light status, a monitored rate of movement of other road users, and/or the like. If the vehicle 10 can charge while moving, then block 1604 may be omitted or implemented be determining whether a speed of the vehicle 10 will be below a threshold, while at the charging location.

Decision block 1606 comprises determining an expected duration for which the vehicle 10 will be operably coupled to the traction battery charging interface 1700. In this example, the method 1600 at least requires the duration to be above a threshold. If the duration is above a threshold, the method 1600 continues. If the duration is below a threshold, the method 1600 terminates. Duration may be expressed using a time-dependent parameter. The time-dependent parameter may be expressed as time spent, or as a predicted amount of charge to be gained at the charging interface 1700, and/or the like.

In some examples, determining the expected duration is dependent on monitoring of at least one of: traffic movement associated with a path of the vehicle 10; or monitoring of dynamic right of way information. The path of the vehicle 10 is known from manoeuvre planning. Traffic movement can be monitored by monitoring a queue that the vehicle 10 is in or approaching, for example. Traffic movement can be monitored using localization sensor information. Dynamic right of way information indicates a traffic lights, priority signs and other road instructions in the path of the vehicle 10 that provide conditional and/or timed right of way to different traffic streams. If a traffic light will be green or a queue is moving well, then the vehicle 10 may not be able to charge. If the vehicle 10 must wait in a queue, then the vehicle 10 may be able to charge.

In a traffic light use case, the charging interface 1700 is associated with a traffic light, and checking the duration may comprise determining a traffic light parameter indicative of how long the traffic light will indicate red/yield once the vehicle 10 has reached the charging interface 1700. The traffic light parameter may be obtained via V2I communication with a traffic light controller, for example. For a pedestrian crossing use case, checking the duration may comprise determining utilization of the pedestrian crossing from localization sensor information.

Determining the expected duration may comprise determining a usage status of the vehicle 10. The usage status may depend on a detected number of occupants of the vehicle. In some examples, the usage status may depend on a schedule such as a timetable, and a time of day. The expected duration may increase while the vehicle 10 is not occupied and/or is not providing a service and/or at off-peak times.

In some examples, the vehicle 10 may stop at one or more predetermined stopping locations such as taxi ranks or passenger stops, with inductive charging capability. Determining the expected duration may comprise determining information associated with the stopping location, such as a class of the stopping location (e.g. taxi rank rather than passenger stop), an average duration of stop at the stopping location, etc.

An optional further decision (not shown) may comprise determining whether a current for predicted state of charge of the traction battery 312 is below a threshold. In this example, the method 1600 at least requires the state of charge to be below a threshold. If the state of charge is below the threshold, the method 1600 may continue. If the state of charge is above the threshold, the method 1600 may terminate. The threshold may be a value from the range 80% to 100% of a full charge. The prediction may be journey-dependent, i.e. based on user-dependent journey requirements.

Once all of the above requirements have been satisfied, block 1608 comprises controlling the active suspension 402 to commence modifying the height/angle of the vehicle body towards the setpoint. In a use case, the ride height of the vehicle body is typically higher when driving than the optimum height for wireless inductive charging. Therefore, block 1608 may at least comprise reducing an average height (ride height) of the vehicle 10. A ride height from the range 60-100 mm is generally associated with efficient wireless inductive charging.

The control system 2 may determine to commence block 1608 at a predetermined time before the charging interface 1700 is reached. The predetermined time is at least approximately 0.5 seconds. In some examples, the predetermined time is a value from the range approximately 0.5 seconds to 10 seconds. A longer time allows a slower rate of change for comfort, but with a greater chance of abort if conditions change unexpectedly. A shorter time towards 0.5-1 second provides a greater chance that the vehicle 10 is in-motion and slowing when the active suspension control commences. The cabin acceleration and particularly jerk associated with commencing block 1608 is therefore an imperceptible component of resultant cabin accelerations/jerk associated with deceleration forces and road-induced cabin motion. Determining whether the time to reach the charging interface 1700 has reached the predetermined time may comprise determining the distance to the charging interface 1700 divided by predicted speed of the vehicle 10. The predicted speed and distance may be known from manoeuvre planning and/or map data.

The rate of modification of the height may be controlled to be less than a threshold or limit, for comfort.

Since the vehicle 10 has not yet reached the charging interface 1700, the setpoint height/angle may be initially calculated via an open loop control process. The open loop setpoint may be the same or different for each charging interface 1700. If different, the open loop setpoint for each charging interface 1700 may be determined using historical data of previous values of the setpoint during previous charges of the vehicle 10 at the charging interface 1700. The setpoint may be determined in dependence on charging of other vehicles using V2V communication. The setpoint may be provided by V2I communication.

The setpoint may be further controlled once the vehicle 10 has reached the charging interface 1700, using closed loop feedback on charging efficiency, to further optimize resonant inductive coupling and find peak charging efficiency.

Block 1610 comprises commencing charging of the vehicle 10 via the charging interface 1700. The charging may commence once an onboard charging interface 1702 of the vehicle 10 is longitudinally (x-axis) and/or laterally (y-axis) aligned with the charging interface 1700. The charging may commence before or after the height and/or angle of the vehicle 10 has reached the setpoint.

Block 1612 comprises receiving information indicative that vehicle 10 is to move away from the traction battery charging interface 1700 and cease traction battery charging. Block 1612 may determine, during charging, whether this information has been received. This information may be received via monitoring of traffic movement associated with a path of the vehicle 10 and/or monitoring of dynamic right of way information such as a traffic light.

Once the information of block 1612 is received, the method 1600 proceeds to block 1614, which comprises controlling the active suspension 402 to reach a second required height and/or angle of the vehicle 10 not associated with traction battery charging. The second required height and/or angle is non-dependent on the charging interface 1700. The second required height/angle may be the same as or similar to a height/angle prior to block 1608.

Block 1614 may be controlled to commence after the vehicle 10 has commenced moving away from the traction battery charging interface 1700, to be less noticeable to vehicle occupants. The rate of change towards the second required height/angle may be different from the rate associated with block 1608.

It would be appreciated that in other implementations of the above method 1600, a charging technology other than wireless inductive charging may be used. For example, the charging interface may be configured for galvanic contact with a contactor on the vehicle 10, and changing the height/angle of the vehicle 10 may enable the galvanic contact.

The methods 1200 and 1400 for ingress/egress may have a higher priority than the present method 1600 for inductive charging. The control system may determine whether ingress/egress will occur while the vehicle 10 is stopped over the charging interface 1700. For example, the control system may determine whether an ingress/egress request has been received. The method 1600 may terminate prior to block 1608 if ingress/egress will occur. The methods 1200 and/or 1400 may be performed instead. In some examples, the suspension may lower for inductive charging (block 1608) after ingress/egress is complete and while the vehicle 10 is stopped at the charging interface 1700.

Locking in Place

Figure 18:
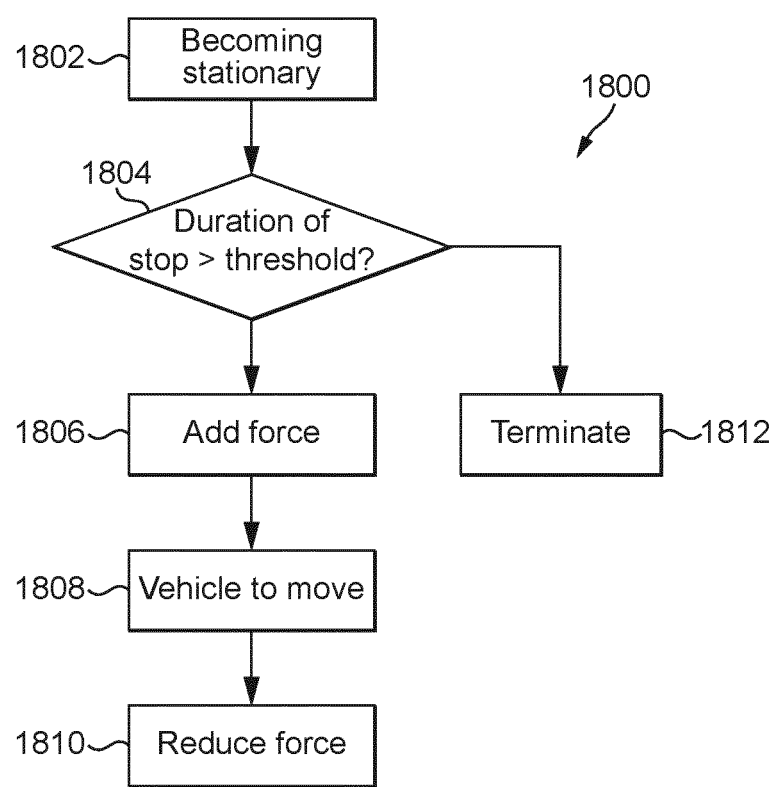
FIG. 18 illustrates an example of a control method.

FIG. 18 illustrates another control method 1800 that improves vehicle accessibility, according to a further aspect of the invention. The control method 1800 at least comprises:

receiving information indicative of the vehicle 10 becoming stationary (block 1802); and increasing a force of the active suspension 402 in dependence on the receiving information indicative of the vehicle 10 becoming stationary (block 1806).

Increasing the force provides a stiffer, more stable platform, when occupants are likely to embark/disembark from the vehicle 10 or shift around inside the cabin 300 because the vehicle 10 is stationary. The stiffer platform results in less rocking of the vehicle body. This lack of rocking provides the sensation of being in a high-mass vehicle like a bus, which is advantageous for customer acceptance of smaller-sized autonomous transit vehicles. The reduced rocking also reduces the chance of unintended jostling between users and the body 302 of the vehicle 10 during ingress/egress.

Receiving information indicative of the vehicle 10 becoming stationary, at block 1802, may be implemented in various ways. The control system 2 may determine whether the vehicle 10 is transitioning from a moving state to a stationary (stopped) state. If so, the method 1800 continues. If not, the method 1800 terminates. The indicative information may be detected or predicted. Detecting the vehicle 10 becoming stationary may comprise detecting that the vehicle 10 has become stationary, e.g. from wheel speed signals. Predicting the vehicle 10 becoming stationary is enabled by manoeuvre planning.

In some, but not necessarily all examples, the control system 2 may determine whether the vehicle 10 is stopping for ingress/egress, and only perform the method 1800 if ingress/egress is to take place. This is because ingress/egress is associated with greater load shifting to/from the cabin 300.

An optional decision block 1804 is shown which comprises determining a duration for which the vehicle 10 is stationary. The method at least requires the duration to be above a threshold. If the duration is above a threshold, the method 1800 continues. If the duration is below a threshold, the method 1800 may terminate to block 1812. The duration may be a detected duration for which the vehicle 10 has already been stationary, and the threshold may be a value from the range approximately 0.5 seconds to approximately 5 seconds, for example. The duration may be an expected duration for which the vehicle 10 will be stationary, and the threshold may be a value of at least approximately 5 seconds.

Then, the method 1800 proceeds to block 1806 and increases the force of the active suspension 402. Increasing the force may comprise increasing the hereinbefore-described variable force parameter. For example, increasing the force may comprise increasing the force demand, which may comprise increasing the spring force demand and/or the damping force demand. In other examples, the active suspension 402 may comprise stilts that lower towards the ground to increase the overall force of the active suspension 402.

In an implementation, block 1806 may comprise determining whether the vehicle 10 has become stationary, for example to confirm the earlier prediction. The force is increased if the vehicle 10 is detected as stationary. By increasing the force no earlier than when the vehicle 10 has stopped, the occupant will not experience any increase in cabin vibration or harshness associated with stiffer suspension, as the vehicle 10 is stopping.

At block 1808, the method 1800 comprises receiving information indicative of the vehicle 10 starting to move. As with block 1802, the information may be predictive or detected. The force may be reduced in a return direction when the indicative information is received. At block 1810, the force is reduced to a normal 'driving' value, which be identical or similar to the force prior to block 1806, in response to block 1808.

Many of the methods described above refer to controlling suspension height and/or angle. This creates a possibility that suspension height will be lowered. Therefore, an optional determination may be performed prior to controlling suspension height and/or angle. The determination may be indicative of a minimum achievable height of the vehicle 10. The determination may be dependent on the detected road surface at the charging interface. The determination may be dependent on sensing of protrusions such as bumps, ridges or objects, via external-facing vision systems of the vehicle 10.

Any change in height may be constrained to lowering the active suspension 402 at one or more corners of the vehicle 10 to a height no lower than the minimum height. Additionally or alternatively, the method may be terminated if the predetermined minimum height is the result of a detected on-road object (whether classified or not), or if the predetermined minimum height is above a threshold. In some examples, lowering ride height while the vehicle 10 is moving may be accompanied by increasing the variable force parameter.

The various thresholds and predetermined times described in the methods herein may be fixed or variable. Fixed thresholds/fixed predetermined times may be determined through calibration to reduce uncomfortable suspension changes. Variable thresholds/variable predetermined times may be user-dependent or context-dependent.

All of the above-described control methods are performed by a control system 2 such as described above. A control method is therefore defined as a computer-implemented method. The steps of the methods may be performed centrally or distributed over a plurality of networked control systems.

References to the control system 2 determining whether a condition is satisfied (decision blocks) cover either of: the control system 2 obtaining raw, unprocessed data and making the determination internally; and the control system 2 obtaining the result of an externally-made determination. References to the control system 2 receiving information indicative of a context as described for the above methods covers either of: the control system 2 obtaining raw, unprocessed data and internally determining whether the context exists; and the control system 2 obtaining the result of an externally-made determination that the context exists.

For purposes of this disclosure, it is to be understood that the controller(s) 20 described herein can each comprise a control unit or computational device having one or more electronic processors 22. A vehicle 10 and/or a control system 2 thereof may comprise a single control unit or electronic controller or alternatively different functions of the controller(s) may be embodied in, or hosted in, different control units or controllers. A set of instructions 26 could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the flowcharts may represent steps in a method and/or sections of code in the computer program 26. The illustration of a particular order to the blocks does not necessarily imply that there is a required or preferred order for the blocks and the order and arrangement of the block may be varied. Furthermore, it may be possible for some steps to be omitted.

Each passage described as an 'aspect of the invention' is a self-contained statement suitable for a current or future independent claim, with no additional features required.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling an active suspension of a vehicle comprising a vehicle body and a plurality of wheels, the control system comprising one or more controllers, the control system configured to:
receive, from at least one cabin sensor, information indicative of vehicle occupancy and/or occupant behavior, the information being indicative of a requirement for ingress/egress of passengers and/or cargo;
receive information indicative that the ingress/egress is to occur with the vehicle on a sloped surface; and
in dependence on the received information indicative of vehicle occupancy and/or occupant behavior, control the active suspension to reduce an angle of the vehicle body relative to horizontal, for the ingress/egress on the sloped surface.

2. The control system of claim 1, wherein:
the sloped surface comprises a transverse slope and the active suspension is configured to tilt the vehicle body about a roll axis to reduce the angle of the vehicle body, and/or
the sloped surface comprises a longitudinal slope and the active suspension is configured to pitch the vehicle body about a pitch axis to reduce the angle of the vehicle body.

3. The control system of claim 1, configured to:
determine a magnitude of slope of the surface; and
control the active suspension to reduce the angle of the vehicle body relative to horizontal for the ingress/egress on the sloped surface when the determination is that the magnitude is above a threshold, and not control the active suspension to reduce the angle of the vehicle body relative to horizontal for the ingress/egress on the sloped surface when the determination is that the magnitude is below the threshold.

4. The control system of claim 1, configured to:
determine whether the surface slopes in a first direction or in a second opposite direction; and
control the active suspension to reduce the angle of the vehicle body relative to horizontal for the ingress/egress on the sloped surface up to a first limit when the determination is that the surface slopes in the first direction and up to a second limit when the determination is that the surface slopes in the second direction.

5. The control system of claim 1, configured to:
poll for information indicative of at least one ingress/egress characteristic; and
control the active suspension to reduce the angle of the vehicle body relative to horizontal for the ingress/egress on the sloped surface when the polling does not obtain information indicative of at least one ingress/egress characteristic, and not control the active suspension to reduce the angle of the vehicle body relative to horizontal for the ingress/egress on the sloped surface when the polling obtains information indicative of at least one ingress/egress characteristic.

6. The control system of claim 5, wherein the information indicative of at least one ingress/egress characteristic comprises a wheel ingress/egress requirement associated with wheeling an object onto/off the vehicle.

7. The control system of claim 5, wherein the information indicative of at least one ingress/egress characteristic comprises a loading/unloading of cargo requirement associated with loading cargo onto/off the vehicle.

8. The control system of claim 1, wherein the information indicative of a requirement for ingress/egress is indicative of a requirement for the vehicle to autonomously stop in response to a user request for ingress/egress.

9. The control system of claim 8, wherein a location of the sloped surface is associated with an autonomously selected ingress/egress location, wherein the selection is dependent on a user-dependent route of the vehicle and information from at least one localization sensor, and wherein the user-dependent route of the vehicle is dependent on a user-dependent journey constraint.

10. The control system of claim 1, configured to:
determine a difference in height and/or a difference in angle, between the vehicle body and an ingress/egress surface; and
control the active suspension to reduce the difference in height, and/or
control the active suspension to reduce the difference in angle of the vehicle body relative to the ingress/egress surface about a second axis and reduce the angle of the vehicle body relative to horizontal about a first axis.

11. The control system of claim 10, configured to:
receive information indicative of a camber of the ingress/egress surface; and
control whether or to what extent the active suspension is controlled to reduce the difference in angle of the vehicle body relative to horizontal, in dependence on the camber.

12. A vehicle comprising the control system of claim 1.

13. A method of controlling an active suspension of a vehicle comprising a vehicle body and a plurality of wheels, the method comprising:
receiving, from at least one cabin sensor, information indicative of vehicle occupancy and/or occupant behavior, the information being indicative of a requirement for ingress/egress of passengers and/or cargo;
receiving information indicative that the ingress/egress is to occur with the vehicle on a sloped surface; and
in dependence on the received information indicative of vehicle occupancy and/or occupant behavior, controlling the active suspension to reduce an angle of the vehicle body relative to horizontal, for the ingress/egress on the sloped surface.

14. A non-transitory, computer-readable storage medium storing instructions thereon that, when executed by one or more electronic processors, causes the one or more electronic processors to carry out the method of claim 13.

15. A control system for controlling an active suspension of a vehicle comprising a vehicle body and a plurality of wheels, the control system comprising one or more controllers, the control system configured to:
receive information indicative of a requirement for ingress/egress of passengers and/or cargo, wherein the information indicative of a requirement for ingress/egress is indicative of a requirement for the vehicle to autonomously stop in response to a user request for ingress/egress;
receive information indicative that the ingress/egress is to occur with the vehicle on a sloped surface; and
control the active suspension to reduce an angle of the vehicle body relative to horizontal, for the ingress/egress on the sloped surface.

16. The control system of claim 15, wherein a location of the sloped surface is associated with an autonomously selected ingress/egress location, wherein the selection is dependent on a user-dependent route of the vehicle and information from at least one localization sensor, and wherein the user-dependent route of the vehicle is dependent on a user-dependent journey constraint.

17. The control system of claim 15, wherein:
the sloped surface comprises a transverse slope and the active suspension is configured to tilt the vehicle body about a roll axis to reduce the angle of the vehicle body, and/or
the sloped surface comprises a longitudinal slope and the active suspension is configured to pitch the vehicle body about a pitch axis to reduce the angle of the vehicle body.

18. The control system of claim 15, configured to:
determine a magnitude of slope of the surface; and
control the active suspension to reduce the angle of the vehicle body relative to horizontal for the ingress/egress on the sloped surface when the determination is that the magnitude is above a threshold, and not control the active suspension to reduce the angle of the vehicle body relative to horizontal for the ingress/egress on the sloped surface when the determination is that the magnitude is below the threshold.

19. The control system of claim 15, configured to:
determine whether the surface slopes in a first direction or in a second opposite direction; and
control the active suspension to reduce the angle of the vehicle body relative to horizontal for the ingress/egress on the sloped surface up to a first limit when the determination is that the surface slopes in the first direction and up to a second limit when the determination is that the surface slopes in the second direction.

20. The control system of claim 15, configured to:
poll for information indicative of at least one ingress/egress characteristic; and
control the active suspension to reduce the angle of the vehicle body relative to horizontal for the ingress/egress on the sloped surface when the polling does not obtain information indicative of at least one ingress/egress characteristic, and not control the active suspension to reduce the angle of the vehicle body relative to horizontal for the ingress/egress on the sloped surface when the polling obtains information indicative of at least one ingress/egress characteristic.

* * * * *